United States Patent [19]
Robinson

[11] Patent Number: 5,432,795
[45] Date of Patent: Jul. 11, 1995

[54] SYSTEM FOR REPORTING ERRORS OF A TRANSLATED PROGRAM AND USING A BOUNDRY INSTRUCTION BITMAP TO DETERMINE THE CORRESPONDING INSTRUCTION ADDRESS IN A SOURCE PROGRAM

[75] Inventor: Scott G. Robinson, Tyngsboro, Mass.

[73] Assignee: Digital Equipment Corporation, Maynard, Mass.

[21] Appl. No.: 700,770

[22] Filed: May 15, 1991

Related U.S. Application Data

[63] Continuation-in-part of Ser. No. 666,025, Mar. 7, 1991, Pat. No. 5,307,504.

[51] Int. Cl.$^6$ .............................. G06F 9/45
[52] U.S. Cl. .......................... 371/19; 395/575; 395/700; 364/737; 364/265.6; 364/267; 364/267.91; 364/DIG. 1
[58] Field of Search ............... 395/575, 500, 700, 725; 364/280.4, 275.5, 265.5, 280.1, 737; 371/19

[56] References Cited

U.S. PATENT DOCUMENTS

| | | | |
|---|---|---|---|
| 4,500,952 | 2/1985 | Heller et al. | 395/400 |
| 4,855,905 | 8/1989 | Estrack et al. | 364/200 |
| 4,858,114 | 8/1989 | Heath et al. | 395/775 |
| 5,133,072 | 7/1992 | Buzbee | 395/700 |
| 5,179,703 | 1/1993 | Evans | 395/700 |

FOREIGN PATENT DOCUMENTS

| | | |
|---|---|---|
| 0261247 | 3/1988 | European Pat. Off. . |
| 0372835 | 6/1990 | European Pat. Off. . |
| 9001738 | 2/1909 | WIPO . |

OTHER PUBLICATIONS

"Turbo Pascall Owners Handbook", ver 4.0 © 1987 Chapter 9, pp. 125-142.
Bergh et al., "HP 3000 Emulation on HP Precision Architecture Computers," Hewlett-Packard Journal, Dec. 1987, pp. 87-89.
Beyond RISC!—An Essential Guide To Hewlett-Packard Precision Architecture, Wayne E. Holt, Ed., pp. 225-238.
Eve M. Tanner, "Providing Programmers with a Driver Debug Technique," Hewlett-Packard Journal, Oct. 1989, pp. 76-80.
Banning, "The XDOS Binary Code Conversion System," COMPCON 89 (Sep. 27, 1989) San Francisco, Calif, pp. 282-287.
Hunter and Banning, "DOS at RISC," Byte, vol. 14, No. 12, (Nov. 1989), St. Peterborough, United States, pp. 361-368.
Gaines, "On the Translation of Machine Language Programs," Communications of the Association for Computing Machinery, vol. 8, No. 12, (Dec. 1965), New York, N.Y., pp. 736-741.

Primary Examiner—Thomas C. Lee
Assistant Examiner—Sang Hui Kim
Attorney, Agent, or Firm—Arthur W. Fisher; Gary E. Ross

[57] ABSTRACT

In a situation where a first computer program has been translated to obtain a second computer program, an error occurring during execution of the second computer program is reported in the context of the first program. This is done by aborting execution of the second computer program when the error occurs; determining a first address which is the address of the instruction in the second computer program that caused the error; determining from the first address a second address of an instruction in the first computer program from which the instruction in the second computer program was translated; and reporting that the error occurred, and using the second address to indicate that the error is associated with the instruction in the first computer program. Preferably the second address is used to reference traceback and symbolic name information generated when the first computer program is compiled from source code. The traceback information provides the line number of the source code from which the instruction in the first computer program was compiled, and the symbolic name information provides the name of a routine containing the instruction in the first program or a variable used by the instruction.

24 Claims, 12 Drawing Sheets

```
┌─────────────────────────────────────────────────────────┐ ←220
│ DEBUG INFORMATION                              ┌─221    │
│ ┌───────────────────────────────────────────┐           │
│ │ TRACEBACK INFORMATION                     │           │
│ │                                           │           │
│ │   SOURCE CODE LINE NO. 1    <X-ADDRESS RANGE>         │
│ │   SOURCE CODE LINE NO. 2    <X-ADDRESS RANGE>         │
│ │     ⋮                                     │           │
│ └───────────────────────────────────────────┘           │
│                                                 ┌─222   │
│ ┌───────────────────────────────────────────┐           │
│ │ SYMBOLIC NAME INFORMATION                 │           │
│ │                                           │           │
│ │   GLOBAL VARIABLE POINTER 1    <X-ADDRESS RANGE>      │
│ │   GLOBAL VARIABLE POINTER 2    <X-ADDRESS RANGE>      │
│ │     ⋮                                     │           │
│ │   ROUTINE         POINTER R1   <X-ADDRESS RANGE>      │
│ │   LOCAL VARIABLE  POINTER R1V1 <STACK FRAME OFFSET>   │
│ │   LOCAL VARIABLE  POINTER R1V2 <STACK FRAME OFFSET>   │
│ │     ⋮                                     │           │
│ │   ROUTINE         POINTER R2   <X-ADDRESS RANGE>      │
│ │   LOCAL VARIABLE  POINTER R2V1 <STACK FRAME OFFSET>   │
│ │   LOCAL VARIABLE  POINTER R2V2 <STACK FRAME OFFSET>   │
│ │     ⋮                                     │           │
│ │   ROUTINE         POINTER R3   <X-ADDRESS RANGE>      │
│ │   LOCAL VARIABLE  POINTER R3V1 <STACK FRAME OFFSET>   │
│ │   LOCAL VARIABLE  POINTER R3V2 <STACK FRAME OFFSET>   │
│ │     ⋮                                     │           │
│ └───────────────────────────────────────────┘           │
│                                                 ┌─223   │
│ ┌───────────────────────────────────────────┐           │
│ │ SYMBOLIC NAMES                            │           │
│ │   ASCII STRING 1, ASCII STRING 2, ⋯       │           │
│ │   ASCII STRING R1, ASCII STRING R1V1,     │           │
│ │   ASCII STRING R1V2, ⋯                    │           │
│ │   ASCII STRING R2, ASCII STRING R2V1,     │           │
│ │   ASCII STRING R2V2, ⋯                    │           │
│ │   ASCII STRING R3, ASCII STRING R3V1,     │           │
│ │   ASCII STRING R3V2, ⋯                    │           │
│ └───────────────────────────────────────────┘           │
└─────────────────────────────────────────────────────────┘
```

*FIG. 14*

SYSTEM FOR REPORTING ERRORS OF A TRANSLATED PROGRAM AND USING A BOUNDRY INSTRUCTION BITMAP TO DETERMINE THE CORRESPONDING INSTRUCTION ADDRESS IN A SOURCE PROGRAM

The present application is a continuation-in-part of Scott G. Robinson and Richard L. Sites, "IMPROVED SYSTEM AND METHOD FOR PRESERVING INSTRUCTION GRANULARITY FOR TRANSLATED PROGRAM CODE", U.S. Ser. No. 07/666,025, filed Mar. 7, 1991, now U.S. Pat. No. 5,307,504.

CROSS-REFERENCE TO RELATED APPLICATIONS

Reference is made to the following patent application, which is hereby incorporated by reference:

Ser. No. 07/666,071, filed Mar. 7, 1991, entitled IMPROVED SYSTEM AND METHOD FOR PRESERVING INSTRUCTION STATE-ATOMICITY FOR TRANSLATED PROGRAM CODE by Scott G. Robinson, Richard Sites and Richard Witek, now abandoned.

Reference is also made to the following patent applications assigned to the present assignee and related to code translation:

Ser. No. 07/666,070, filed Mar. 7, 1991, entitled BRANCH RESOLUTION VIA BACKWARD SYMBOLIC EXECUTION by Richard L. Sites, now pending.

Ser. No. 07/666,216, filed Mar. 7, 1991, entitled LOCATING PROGRAM CODE BY SUCCESSIVE CODE EXECUTION AND INTERPRETATION by Richard L. Sites, now U.S. Pat. No. 5,287,450.

Ser. No. 07/666,210, filed Mar. 7, 1991, entitled USE OF STACK DEPTH TO IDENTIFY MACHINE CODE MISTAKES by Richard L. Sites, now pending.

Ser. No. 07/662,223, filed Mar. 7, 1991, entitled CROSS-IMAGE REFERENCING OF PROGRAM CODE by Richard L. Sites, now U.S. Pat. No. 5,336,766.

Ser. No. 07/666,083, filed Mar. 7, 1991, entitled USE OF STACK DEPTH TO IDENTIFY ARCHITECTURE AND CALLING STANDARD DEPENDENCIES IN MACHINE CODE by Thomas R. Benson, now U.S. Pat. No. 5,301,325.

Ser. No. 07/666,084, filed Mar. 7, 1991, entitled REGISTER USAGE TRACKING TO SUPPORT COMPILED 32-BIT CODE IN 64-BIT ENVIRONMENT by Thomas R. Benson, now U.S. Pat. No. 5,339,238.

Ser. No. 07/666,085, filed Mar. 7, 1991, entitled MAPPING ASSEMBLY LANGUAGE ARGUMENT LIST REFERENCES IN TRANSLATING CODE FOR DIFFERENT MACHINE ARCHITECTURES by Thomas R. Benson, now U.S. Pat. No. 5,307,492.

Ser. No. 07/666,082, filed Mar. 7, 1991, entitled TRACKING CONDITION CODES IN TRANSLATING CODE FOR DIFFERENT MACHINE ARCHITECTURES by Thomas R. Benson, now pending.

Ser. No. 07/666,023, filed Mar. 7, 1991, entitled LINKING OF PROGRAM UNITS AT PROGRAM ACTIVATION by Daniel L. Murphy, now U.S. Pat. No. 5,297,291.

Ser. No. 07/666,196, filed Mar. 7, 1991, entitled AUTOMATIC FLOWGRAPH GENERATION FOR PROGRAM ANALYSIS AND TRANSLATION by Richard L. Sites, now pending.

Reference is also made to the following patent applications assigned to the present assignee.

Ser. No. 07/666,039, filed Mar. 7, 1991, entitled IMPROVED SYSTEM AND METHOD FOR EXECUTING MULTIPLE CODES IN A MULTI-ARCHITECTURE ENVIRONMENT WITH CODE DEBUGGING CAPABILITY by Mark A. Herdeg, James A. Wooldridge, Scott G. Robinson, Ronald F. Brender and Michael V. Iles, now abandoned.

Ser. No. 07/666,028, filed Mar. 7, 1991, entitled SYSTEM AND METHOD FOR AUTOMATICALLY INTERFACING CALL CONVENTIONS BETWEEN TWO DISSIMILAR PROGRAM UNITS by Daniel L. Murphy, now abandoned.

Ser. No. 07/665,888, filed Mar. 7, 1991, entitled IMPROVED SOFTWARE DEBUGGING SYSTEM AND METHOD ESPECIALLY ADAPTED FOR CODE DEBUGGING WITHIN A MULTI-ARCHITECTURE ENVIRONMENT by James A. Wooldridge, Ronald F. Brender and Henry N. Grieb, III, now pending.

Ser. No. 07/666,022, filed Mar. 7, 1991, entitled IMPROVED SIMULATOR SYSTEM AND METHOD ESPECIALLY ADAPTED FOR CODE EXECUTION IN A MULTI-CODE EXECUTION AND DEBUGGING SYSTEM WITHIN A MULTI-ARCHITECTURE ENVIRONMENT by Mark A. Herdeg and Michael V. Iles, now abandoned.

Ser. No. 07/666,072, filed Mar. 7, 1991, entitled IMPROVED SYSTEM AND METHOD FOR DETECTING CROSS-DOMAIN INSTRUCTION CALLS AND DATA REFERENCES ESPECIALLY ADAPTED FOR CODE INTERFACE JACKETING IN A MULTI-CODE EXECUTION AND DEBUGGING SYSTEM WITHIN A MULTI-ARCHITECTURE ENVIRONMENT by Mark A. Herdeg, Scott G. Robinson, Ronald F. Brender and Michael V. Iles, now abandoned.

Ser. No. 07/665,752, filed Mar. 7, 1991, entitled IMPROVED SYSTEM AND METHOD FOR JACKETING CROSS-DOMAIN CALLS IN A MULTI-CODE EXECUTION AND DEBUGGING SYSTEM WITHIN A MULTI-ARCHITECTURE ENVIRONMENT by Ronald F. Brender and Michael V. Iles, now U.S. Pat. No. 5,339,423.

Ser. No. 07/665,886 filed Mar. 7, 1991, entitled FASTER PROCESS FOR DEVELOPING NEW COMPUTER SYSTEMS EMPLOYING NEW AND BETTER PROCEDURES FOR SOFTWARE DEVELOPMENT AND TESTING by Robert V. Landau, James E. Johnson and Michael v. Iles, now abandoned.

BACKGROUND OF THE INVENTION

1. Technical Field

The present invention relates to systems and methods for adapting program codes for execution on different computer systems and more particularly to systems and methods for reporting errors in an original program during the execution of a translation of the original program.

2. Background Art

In the early years of computer programming, instructions for computer programs were generated at the microcode level. With the development and growth of software engineering, more tasks were combined in single complex instructions executable by computers having a hardware architecture designed for the instruction complexity.

Increasing instruction complexity generally provided increasing price/performance benefits in the developing environment of computer hardware costs and performance capabilities. As a result, complex instruction set codes (CISC) became widely accepted.

With increased instruction complexity, however, it has become more difficult to design system hardware for higher execution speed. Instead, a reduced instruction set code (RISC), coupled with correlated RISC computer hardware architecture, has gained acceptance as a mechanism to lead to significantly improved system price/performance.

A RISC system generally employs simpler basic instructions to direct desired operations. A single RISC instruction normally specifies a single operation with at most a single memory access. Further, a RISC system normally provides a register for each basic instruction. The instructions in a RISC instruction set are thus still at a higher level than microcode.

In the typical CISC system, a single instruction may specify a complex sequence of operations and it may make many direct accesses to memory. Thus, operations performed by a CISC instruction may require several RISC instructions.

A RISC system is generally designed with optimized hardware and software tradeoffs that provide faster system operation, better overall system performance and lower system cost relative to available hardware cost and performance capability.

One obstacle to conversion from CISC systems to RISC systems is the existence of large software libraries which have been developed for CISC systems and which are not generally available for RISC systems. When a computer system user chooses to acquire a new computer system, one of the user's major considerations is whether the user's library of application programs can be used or converted for use on the new computer system, and what the cost of replacing that library would be. Thus, for computer system users who wish to achieve better price/performance through RISC computer systems, it is highly important that an economic and effective mechanism be provided for adapting, or "migrating" the user's library of application programs for execution on the RISC computer system.

Several choices are available to the user for program migration. Recompiling or recoding can be employed, but these techniques are typically used for migrating programs written in a high level language such as FORTRAN which either have no detailed machine dependencies or which have any existing machine dependencies removed by manual programming modifications. Further, in recompiling or recoding, the user typically bears all responsibility for program modification and program behavioral guarantees.

Alternatively, interpretation procedures can be used, but the penalty for this approach typically is substantially reduced program performance. More particularly, interpretation procedures are software programs that run on one computer and read a stream of subject instructions (which may well be instructions for a different type of computer) as data, and for each subject instruction perform the indicated operation. Such procedures typically execute 10 to 100 machine instructions on the one computer to interpret a single subject instruction. Thus, interpretation procedures provide substantially reduced program performance, compared to direct execution of functionally-equivalent code on the one computer.

The most effective and efficient migration, however, involves code translation. In code translation, each instruction from an existing program is translated into one or more instructions in the language of the destination machine. Accordingly, a translation of CISC programs to RISC programs, or more generally a program translation in which the translated code has a relatively reduced instruction set, requires "multiple" or "many" instructions in the translated code for each instruction in the code being translated.

A problem resulting from CISC to RISC code translation is that when execution of the translated program aborts due to an error, information about the error is usually based upon the state of the RISC machine. Debugging programs typically associated with high-level CISC source code, however, assume that information about an error is based upon the state of a CISC machine. A debugging program, for example, uses debug information generated when the CISC source code is compiled into CISC object code. The debug information typically includes information associating symbolic (ASCII) names with numerical CISC program and data addresses. The debugging program uses this symbolic name information to permit the programmer to inspect the contents of memory in the CISC machine at addresses specified by selected symbolic names. Typically the debug information also includes traceback information associating line numbers in the CISC source code with corresponding numerical addresses in the CISC object code. When an error occurs during execution of the CISC program in the CISC machine, the operating system in the CISC machine reads a hardware register in the CISC machine to determine the address of the CISC instruction causing the error. The operating system passes this address to an error reporting program that references the traceback information to report to the programmer the line number of the CISC source code from which the error originated.

Because the debugging programs associated with the compilation of CISC source code are based upon CISC object code addresses, CISC instructions, and hardware in the CISC machine, they do not provide the debugging of CISC source code during execution of a translated program on a RISC machine. The debugging of CISC source code during execution of a corresponding RISC object program on a RISC machine could be done by a debug program referencing debug information generated by compiling the CISC source program directly to RISC object code, but this technique would require re-compilation of the CISC source code. Moreover, in some cases CISC source code has been lost or destroyed so that re-compilation is not possible.

SUMMARY OF THE INVENTION

Briefly, in a situation where a first computer program has been translated to obtain a second computer program, the present invention permits an error occurring during execution of the second computer program to be reported in the context of the first computer program. This is done by aborting execution of the second computer program when the error occurs; determining a first address which is the address of the instruction in the second computer program that caused the error; determining from the first address a second address of an instruction in the first computer program from which the instruction in the second computer program was translated; and reporting that the error occurred, and using the second address to indicate that the error is associated with the instruction in the first computer program.

Preferably the second address is used to indicate that the error is associated with the instruction in the first computer program by referencing traceback and symbolic name information generated when the first computer program is compiled from source code. The traceback information is referenced to indicate the line number of the source code from which the instruction in the first computer program was compiled. The symbolic name information is referenced to indicate the symbolic name associated with the error, such as the name of a routine containing the instruction in the first program or a variable used by the instruction.

In a preferred embodiment, the address of the instruction in the first program is determined from the address of the instruction in the second program by referencing an address correlation table and a boundary instruction bit map. The address correlation table includes entries each having an address of a respective instruction in the first program and an address of a first instruction in a set of instructions in the second program having been translated from said respective instruction. The first instruction in a set of instructions in the second program having been translated from a respective instruction in the first program is referred to as a "boundary instruction." The boundary instructions in the second program are distinguished from the other instructions in the second program by flags in the boundary instruction bit map. To find a second address of an instruction in the first program corresponding to a first address in the second program, the address correlation table is searched for the first address to find the second address directly from the table, or otherwise to find the largest address in the second program that is less than the first address. If the second address is not found directly from the table, the boundary instruction bit map is scanned while counting the number of boundary instructions between the first address and said largest address. The second address is then found by advancing an instruction address pointer while parsing this same number of instructions in the first program beginning with the instruction at the address in the table entry that also includes said largest address.

BRIEF DESCRIPTION OF THE DRAWINGS

Other objects and advantages of the invention will become apparent upon reading the following detailed description and upon reference to the drawings in which:

FIG. 14 is a block diagram of debug information which is generated during the compilation of source code for the X application program.

Figure 1:
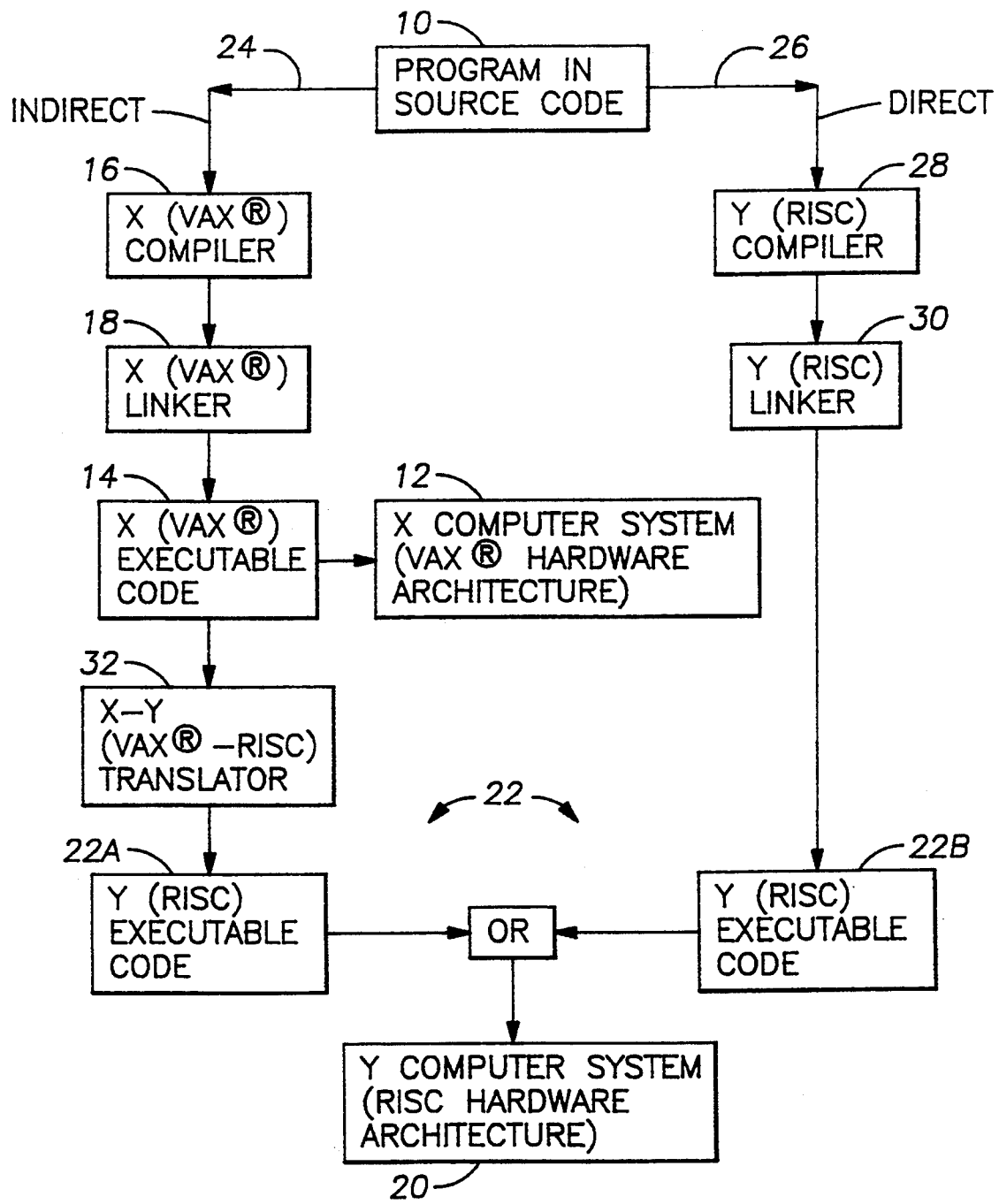
FIG. 1 shows an overall functional block diagram indicating the general manner in which application programs are (a.) created for execution by a first computer system (having a first instruction set and designated X) and (b.) translated for execution by a different computer system (designated as Y) having a relatively reduced instruction set.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the scope of the invention as defined by the appended claims.

DESCRIPTION OF THE PREFERRED EMBODIMENT

As shown in FIG. 1, an application program 10, written in source code, is one of a number of application programs held in a user's program library for execution in an X computer system 12. The hardware architecture for the X computer system 12 is adapted for operation with an X instruction set employed in producing an executable form of the program 10 or other application programs in the user's library.

To adapt the program 10 for use with a Y computer system 20, it is necessary that the executable form of the program 10 be provided as a Y executable code 22 employing a Y instruction set to which the hardware architecture of the Y computer system 20 is adapted.

The Y instruction set generally employs fewer basic instructions than the X instruction set employs, and conversion of X code to Y code requires a "one to many" instructions translation. The X instruction set can be a CISC instruction set and the Y instruction set can be a RISC instruction set. For example, as specifically indicated for illustrative purposes in FIG. 1, the X system can employ the VAX ® architecture and the Y system can employ a reduced instruction set architecture called the RISC architecture within the Digital Equipment Corporation. Both architectures are embodied in equipment made by Digital Equipment Corporation, assignee of the present application.

As shown in FIG. 1, the application program 10 can be migrated to the Y executable code 22 in either an indirect path 24 or a direct path 26. Direct migration is obtained with the use of a Y compiler 28 and a Y linker 30. The resultant Y executable code is designated by the reference numeral 22B.

If a Y compiler 28 and Y linker 30 have never been developed or otherwise are unavailable or the user elects not to use the direct migration path 26 because of associated disadvantages, the indirect path 24 may be used to migrate the X application program to the Y system to achieve both a program investment savings and a system performance gain.

In the indirect path, the program 10 is converted to executable code 14 for the X computer system 12 by means of an x compiler 16 and an X linker 18. The result is X executable code 14 which can run on the X computer system 12. An X-Y translator 32 translates the X executable code designated by the reference numeral 22A. The code translation is achieved so that the Y code executes to achieve the X code results accurately with instruction granularity even though the Y code is based on a reduced instruction set.

Preferably, a code translation system 40 (FIG. 2) is employed to implement the translator 32 referenced in FIG. 1. The translation system 40 includes a conventional general purpose computer having a processor 42, a memory system 44, and various input/output devices (not shown) through which X application code 43 is input for translation.

The translation results are generated in accordance with the present invention as Y code 45 which is ordered to preserve hard guarantees of the code being translated and particularly to facilitate a guaranteed preservation of X instruction granularity when the Y code is actually executed. Hard CISC guarantees are exemplified by hard VAX ® guarantees which are described more fully in the above-referenced application Ser. No. 07/666,071 filed Mar. 7, 1991.

The memory system 44 includes, among other sections, a conventional data storage section 46 and a section 48 in which the computer operating system is stored. A basic element employed in X-Y code translation is a translation program 50 stored in another memory section. The input X code 43 is stored as an X code list 62. Further, to control the sequencing of Y instructions, Y instruction ordering criteria 52 are stored and X-Y instruction code patterns 54 are stored to enable translation of both instruction operation specifiers and instruction operand specifiers.

Figure 3:
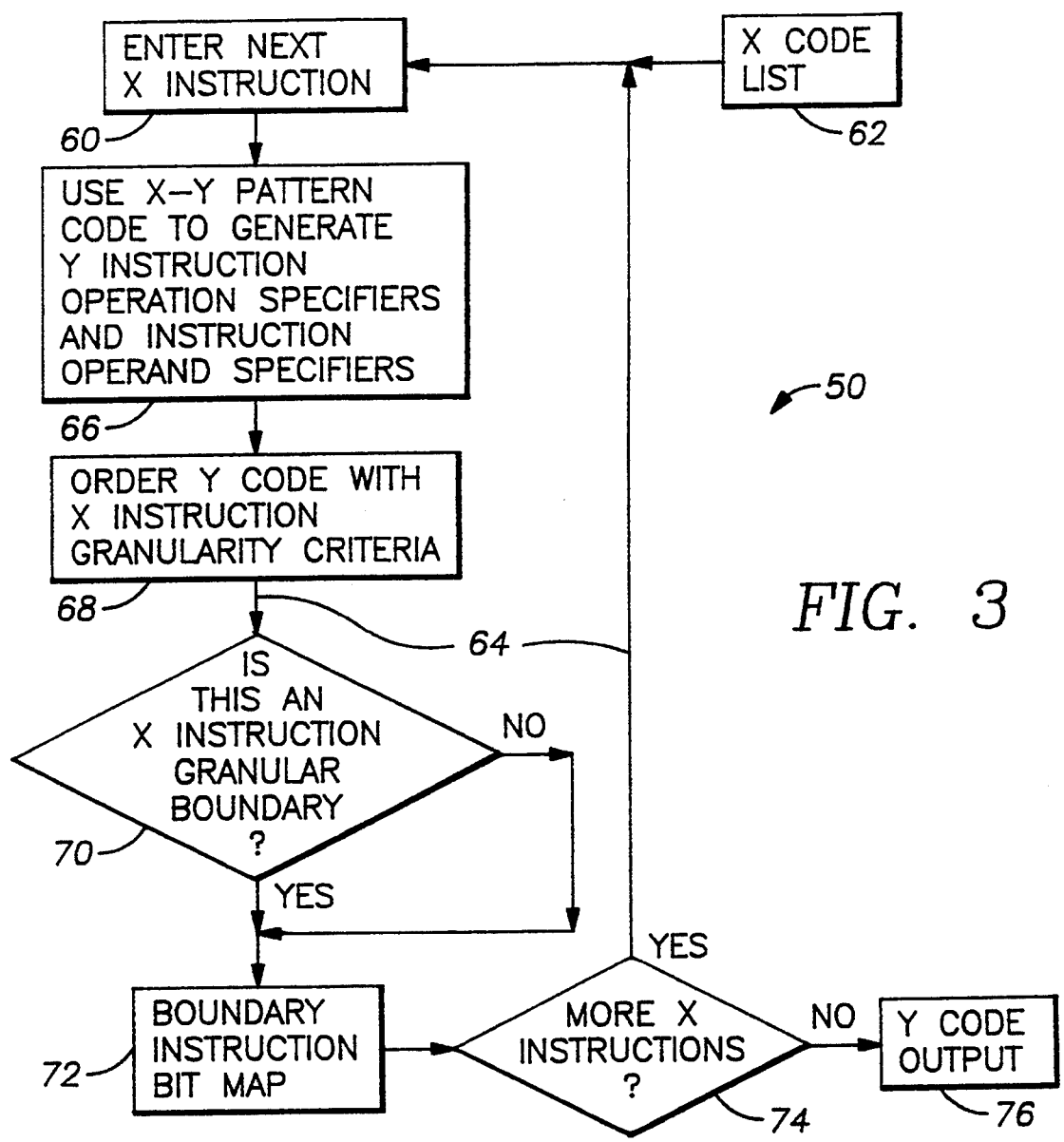
FIG. 3 shows a general flow chart for the X-Y translation program previously shown in FIG. 2.

A general flow chart for the translation program 50 is shown in its preferred form in FIG. 3. In block 60, successive X instructions are entered sequentially from the stored X code list 62 for processing through a program loop 64.

Figure 2:
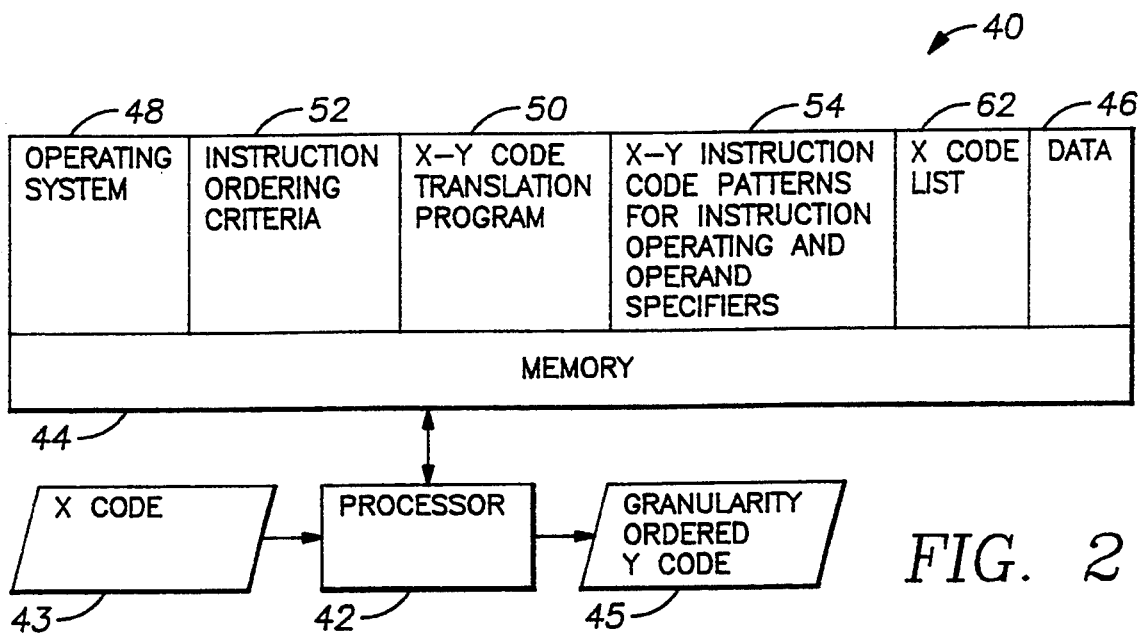
FIG. 2 shows a generalized functional block diagram of the preferred X-Y translation program and a general purpose computer system in which the X-Y translation program is executed to generate, with X instruction granularity, a Y executable application code from an input X application code.

In the loop 64, functional block 66 generates Y instruction operation and operand specifiers corresponding to the currently processed X instruction and in accordance with the stored X-Y code patterns 54 (FIG. 2). Next, as indicated by functional block 68, the resultant Y code is ordered in accordance with predetermined criteria that facilitate preservation of X instruction granularity during subsequent actual Y code execution.

Figure 6:
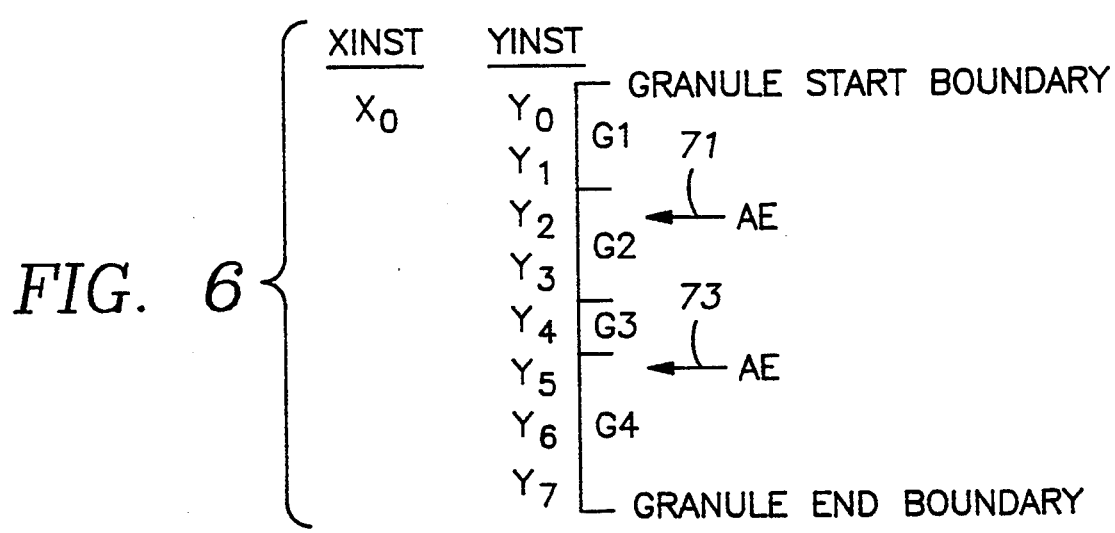
FIG. 6 shows a diagram that symbolizes an X-Y code instruction translation and the relationship of asynchronous events thereto.

A graphic representation of an X-Y instruction translation is shown in FIG. 6.

Every X instruction generally provides for the elemental tasks of getting inputs, modifying inputs, placing the results in temporary storage, and providing a state update for memory and register locations. When an X instruction is translated to "many" Y instructions, the ordering criteria 52 (FIG. 2) employed to organize the Y instructions preferably are those that group and order the Y instructions in the Y code for the currently translated X instruction (granule) as follows:

1. A first group G1 of instructions in the Y code are those that get inputs and place those inputs in temporary storage.
2. A second group G2 of instructions in the Y code are those that operate on inputs, generate modified results, and store those results to temporary storage.
3. A third group G3 of instructions in the Y code are those that update X state (memory or register) and are subject to possible exceptions (as defined hereinafter).
4. A fourth and last group G4 of instructions in the Y code are those that update X state (memory or register) and are free of possible exceptions.

X state includes X memory state and X register state. X memory state, represented by the reference character 94 in FIG. 4, and X register state represented by the reference character 97 refer respectively to memory and register structure in the Y machine dedicated to be X code defined storage locations. X memory and register states can also be said to be memory state and register state that are visible to the X architecture.

As a result of implementing the preferred Y instruction organization criteria in the X-Y code translation, preservation of X instruction granularity is facilitated for the following reasons:

1. If an asynchronous event occurs during Y code execution at any time during the execution of the first two groups G1 and G2 of Y instructions as shown by an arrow 71 in the diagram of FIG. 6, X instruction granularity is maintained by permitting asynchronous event processing and backing up the Y instruction counter PC to the next backup Y instruction ($Y_0$ in FIG. 6) that is a granular boundary for an X instruction.

By aborting execution of the current Y code sequence for a retry, possible breakage of X instruction granularity is avoided because a possible state access failure is avoided in any group G3 instruction in the current Y code sequence. However, as a result of the Y code organization, only temporary storage locations are erased and X instruction granularity is preserved since execution of the current Y code granule has been delayed until it can be processed with instruction granularity after the asynchronous event processing.

2. If an asynchronous event occurs after Y instructions in the groups G1 and G2 have been executed and if there are no Y instructions in the group G3, or if the event occurs after execution of all Y instructions included in the group G3 as indicated by an arrow 73 in FIG. 6, the processing of the asynchronous event can be briefly delayed as the group G4 instructions are executed with foreknowledge that no state exceptions are possible. Again execution is provided with X instruction granularity.

In the case where multiple Y instructions are included in the group G3 (not shown in FIG. 6) and an asynchronous event occurs after one Y instruction has been executed, but at least one Y instruction in the group G3 remains to be executed, memory atomicity can be provided within the current Y code granule for preserving X instruction granularity. Memory atomicity essentially requires that all memory accesses of the X instruction appear to happen or none appear to happen, and is necessary for X instruction granularity.

Memory atomicity and mechanisms for achieving it in such cases as well as other special cases are more fully considered in the concurrently filed and cross referenced patent application (1870-0409). In the preferred embodiment in which simple one-write X instructions are handled, X memory atomicity and X instruction granularity are achieved concurrently.

With reference again to FIG. 3, once the functional block 68 orders the Y instruction code as described, block 70 determines whether the current Y instruction is a boundary or "X granule" marker for the X instruction from which it was derived. The yes and no bits detected for successively processed Y instructions are recorded in an X boundary instruction bit map by functional block 72.

A test block 74 checks whether more X instructions are listed for translation processing. If so, the loop 64 is repeated. When all of the X instructions have been translated, the loop cycling is terminated and the accumulated Y code is made available for output, as indicated by functional block 76.

The follow two specific examples of CISC instruction from the VAX ® architecture exemplify the translation function in accordance with the invention:

EXAMPLE 1

INCL (R1)+

This instruction adds 1 to the longword (4-bytes or 32 bits) of memory whose address is contained in R1. R1 is then incremented to point to the next longword. The following RISC (Y) code was generated from the translator operating with the described organization criteria:

| ldl  | r23,(r1)     | ; Load the contents of memory at address (R1) to R23 |
| ---- | ------------ | ---------------------------------------------------- |
| addl | r23,#1,r24   | ; Increment R23 by 1 and put in R24                  |
| stl  | r24,(r1)     | ; Store R24 in memory at address (R1)                |
| lda  | r1,4(r1)     | ; Increment R1 by four to point to next longword     |

EXAMPLE 2

MOVL (R1)+, (R2)+

This instruction moves the longword from memory addressed by the contents of R1 to the longword addressed by the contents of R2. Both R1 and R2 are incremented to point to the next longword after the one originally pointed to when the instruction began. The following RISC (Y) code was generated from the translator operating with the described organization criteria:

| ldl | r23,(r1) | ; Load the contents of memory at (R1) to R23 |
| --- | -------- | -------------------------------------------- |
| stl | r23,(r2) | ; Store the contents of R23 to memory at location (R2) |
| lda | r1,4(r1) | ; Increment R1 by four to point to next longword |
| lda | r2,4(r2) | ; Increment R2 by four to point to next longword |

For executing the resultant Y code with guaranteed X instruction granularity, a Y processor 80 corresponding to the Y computer system 20 (FIG. 1) is provided for executing the resultant Y code with X instruction granularity guaranteed to be preserved. Conventional data input/output devices 82 and an interval clock 84 are coupled to the Y processor 80, and from time to time these devices generate interrupts constituting asynchronous events that demand a temporary diversion of processor operation from the Y code execution. (FIG. 4) Without guaranteed X-instruction granularity, processor diversion caused by these or other interrupts is capable of causing a breakdown of X instruction granularity in the Y code execution. This typically occurs because of possible Y instruction input changes after the interrupt, but before memory state changes have been made by the current Y instruction.

Figure 4:
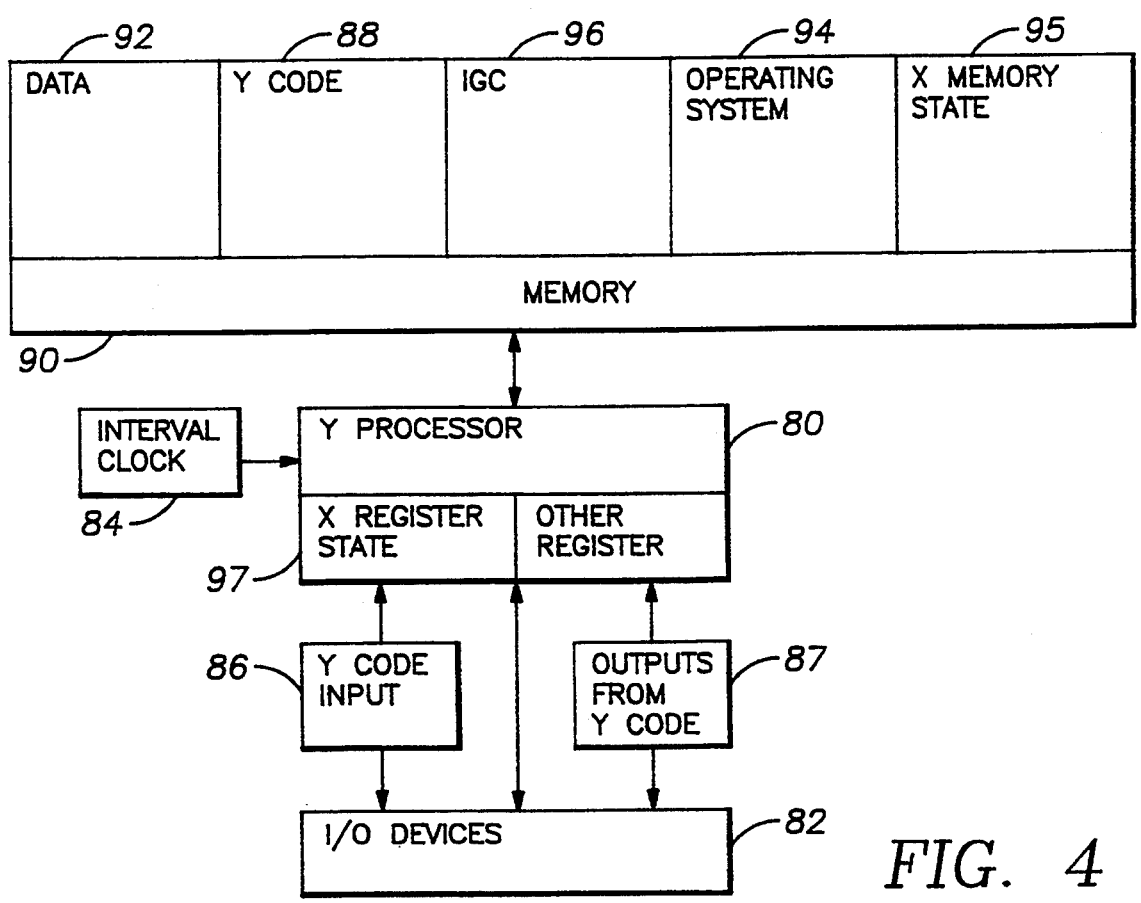
FIG. 4 shows a functional block diagram of the Y computer system with the Y application code obtained from the X code translation and loaded into the Y computer for execution along with an instruction granularity control (IGC) program which supervises execution of the Y code to guarantee preservation of X instruction granularity.

As shown in FIG. 4, a block 86 represents the input of the generated Y code from an input device to a section 88 of a memory system 90 coupled to the Y processor 80, and a block 87 represents data outputs generated for output devices as a result of Y code execution. The memory system 90 also includes a conventional data section 92 and a conventional operating system section 94.

An instruction granularity control program (IGC) 96 is stored in another memory section designated by the same reference character. Operation of the IGC program 96 in the execution of the Y code is more fully represented by the flow charts shown in FIGS. 5A and 5B.

The IGC program 96 (FIG. 5A) starts as indicated at 98 with the generation of an asynchronous event. Generally, an asynchronous event is defined as a diversion of the Y instruction stream due to interrupts that could potentially generate X state changes that are visible to the translated X code. Reference is again made to FIG. 6 for a diagrammatic representation of the relationship of asynchronous events to an X granule of Y instructions. The following exemplifies interaction of an asynchronous event with the Y instruction stream;

```
Normal Execution:          Y0   Y1   Y2   Y3   Y4   Y5
X Instr Boundary-----------------^--------^--------^--
Async Event Execution:     Y0   Y1   Y47  Y48  Y49
Event occurs--------------------------^
```

The IGC program 96 must align the Y instruction address to Y1 (if Y2 has a possible exception as subsequently defined) or to Y3 (by executing Y2 if Y2 has no possible exceptions) before executing any other changes in the X state.

Figure 5A:
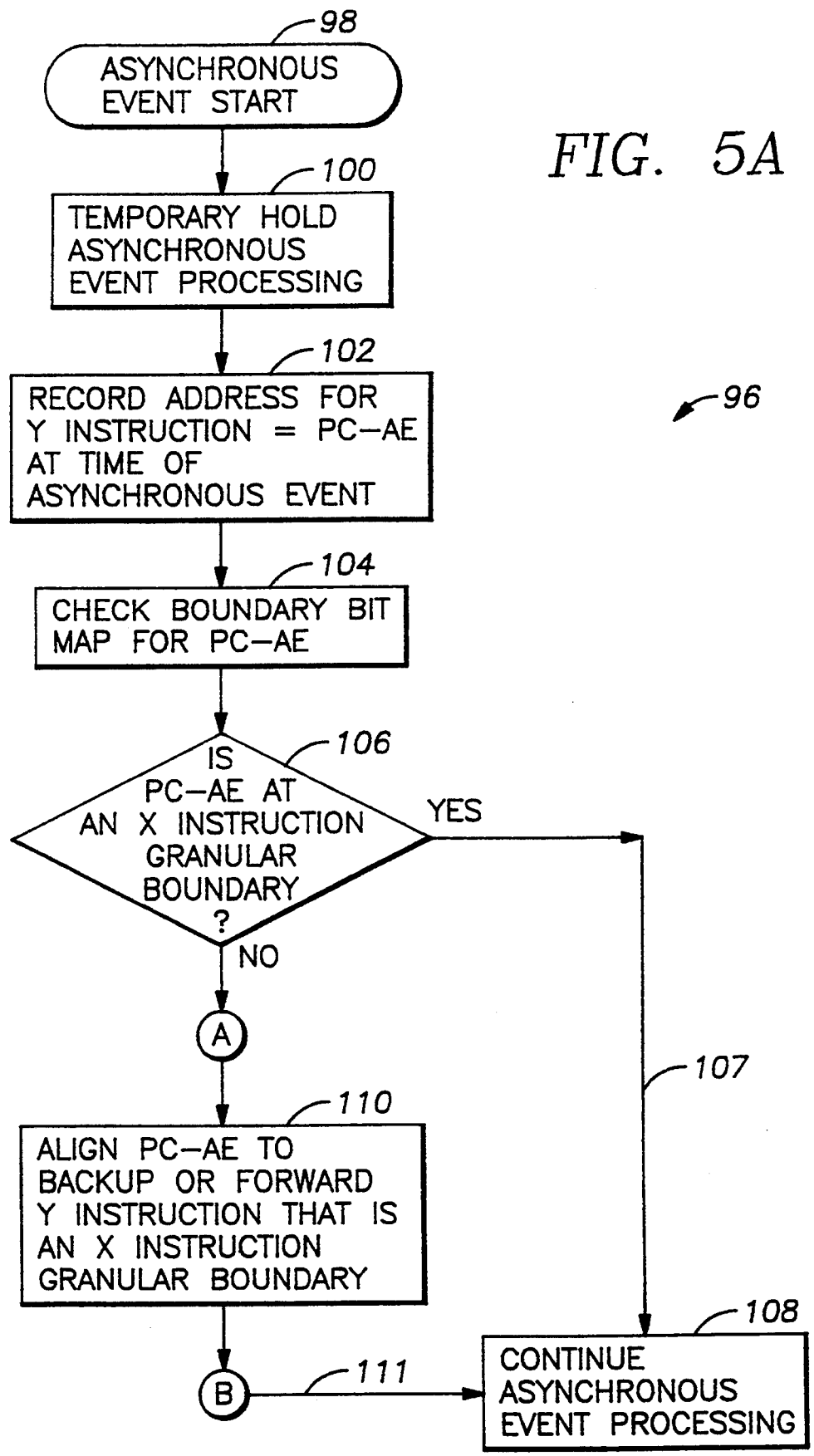
FIGS. 5A and 5B show flow charts representing the preferred functional steps performed by the IGC program.

With reference again to the flow chart in FIG. 5A, a temporary hold is placed on processing the asynchronous event by functional block 100, and the memory address of the Y instruction (designated as PC-AE) being processed at the time of the asynchronous event is recorded by functional block 102.

Next, the previously referenced bit map is checked by block 104 to determine whether the Y instruction PC-AE is an X instruction boundary. If it is, test block 106 directs the IGC program over path 107 to block 108 which allows resumption of processing of the asynchronous event, without breaking X code instruction granularity.

If the Y instruction PC-AE is not an X instruction boundary, functional block 110 aligns the Y instruction counter PC with the next previous or next upcoming forward Y instruction that is an X instruction boundary. A program path 111 is then followed by the IGC program 96 to the block 108 for asynchronous event processing as previously described, again without breaking X code instruction granularity. In this instance, the asynchronous event has occurred at a point in time when not all of the Y instructions have executed within an X instruction granule, and preservation of X instruction granularity is achieved through operation of the program block 110, as more fully detailed in FIG. 5B. The markers "A" and "B" in FIG. 5A indicate where the detail blocks of FIG. 5B fit into the flow chart of FIG. 5A.

Figure 5B:
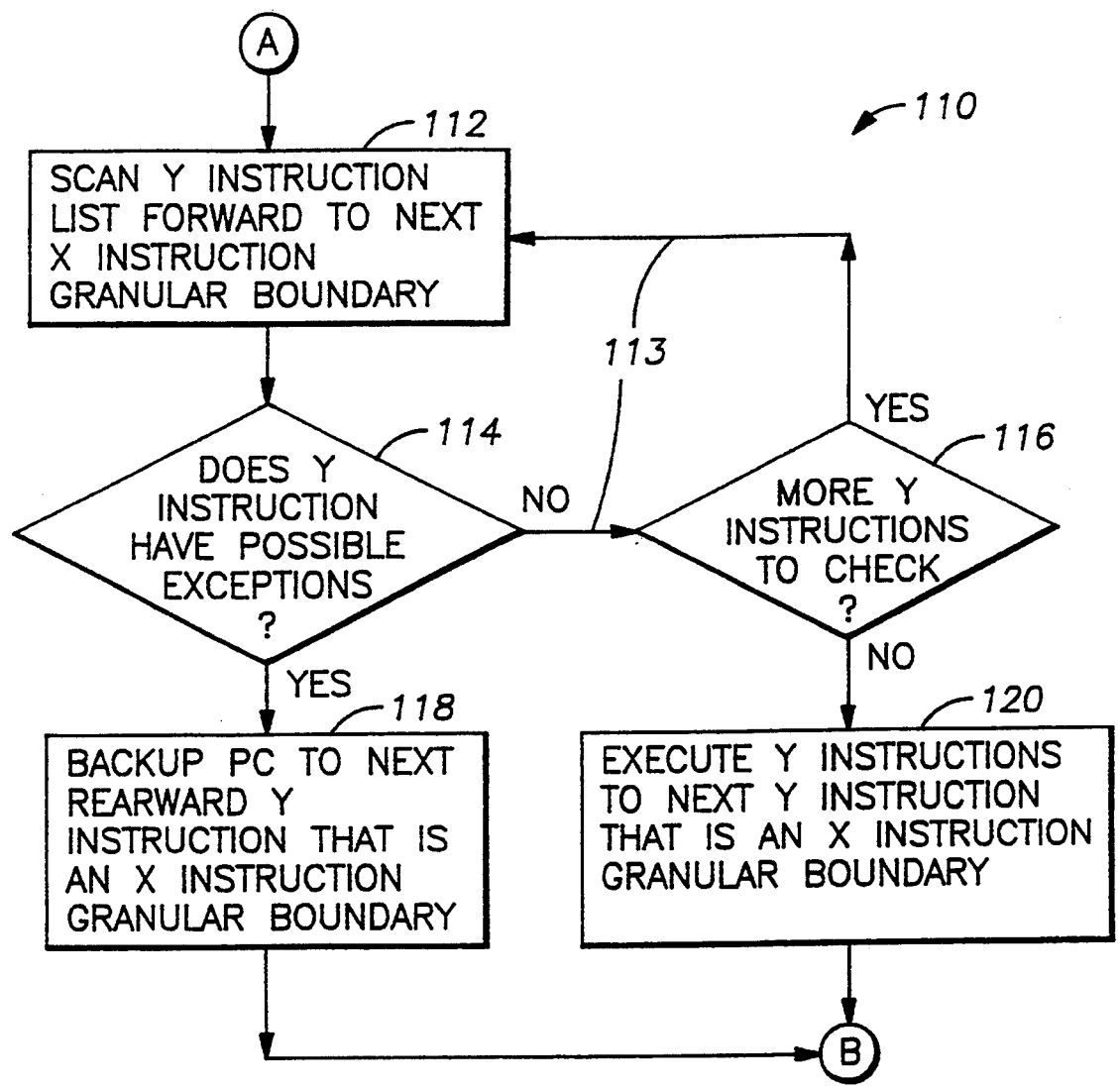

In FIG. 5B, forward scan of the Y instructions is made by functional block 112 in a program loop 113 to find the next Y instruction that is an X instruction boundary. Test block 114 checks each forwardly scanned Y instruction to determine whether processing the interrupt prior to execution of the remaining Y instructions could produce a Y code execution result different from the result that would have been produced had the corresponding X code been executed with imposition of the same asynchronous event.

In making each forward Y instruction test, the test block 114 preferably determines whether an exception condition may be produced by attempted execution of the Y instruction if the asynchronous event were allowed to be processed and the execution of the Y code sequence then rescinded. Generally, an instruction has an exception if it possibly cannot be completed. The following are the general classes of exceptions that, if identified to a forward Y instruction, generate a Y code abort to the next previous Y instruction that is an X boundary:

1.) Memory management exceptions such as access control violations or page faults.
2.) Arithmetic exceptions such as floating point overflow faults or divide by zero faults.
3.) Instruction exceptions such as illegal operation codes or breakpoint operation codes.

In the preferred embodiment of the invention, a list of the applicable exceptions for the code being translated is placed in storage accessible to the IGC program during execution. Execution determinations are thus made by referencing each forwardly scanned Y instruction against the stored exceptions list.

The following is an example of an exception case:
A shared memory location is incremented by an asynchronous event.
INCL @#33 increments location 33.
The RISC instructions are:

| | | |
|---|---|---|
| LDL | R23,33(R31) | ; Load R23 from location 33 |
| LDA | R23,1(R23) | ; Add 1 to the contents of R23 |
| STL | R23,33(R31) | ; Store R23 result back at location 33 |

If the asynchronous event occurs between the LDA and STL instructions, and the processing of the asynchronous event increments location 33, the increment done during the event would be lost when the stream resumes at the STL instruction.

The following is an example of a non-exception case:
The instruction INCL R1 increments R1. The RISC instruction is:

LDA R1,1(R1)    ; Increment R1

There is no opportunity for an exception here.

If in testing successive Y instructions in the forward scan, and, if all scanned Y instructions show no exceptions (block 116), the remaining Y instructions are executed before asynchronous event processing is enabled by block 108 (FIG. 5A) without breaking X instruction granularity as previously described. On the other hand, if a forwardly scanned Y instruction shows an exception under the test by the block 118, functional block 118 backs up the Y program counter to the next backup Y instruction that is an X instruction boundary, and asynchronous event processing is again enabled by the block 108 (FIG. 5A) without breaking X instruction granularity. In this manner, even the possibility of a break in X instruction granularity is avoided and X instruction granularity is thereby guaranteed.

In summary of the case of translating an instruction having no writes to state, or only a single aligned full longword or quadword write, there are no byte- or unaligned-write problems, and no interlocked problems. The only problem is that of making either the entire sequence or none of the sequence appear to execute. The translation is constrained such that in the case of CISC-to-RISC translation, the first and second groups of RISC instructions do all the work of the CISC instruction except for memory and/or register state update, the third group of RISC instructions include zero or one RISC store instruction to a full aligned longword or quadword, and the fourth group of RISC instructions includes only simple register moves.

A translated sequence that is interrupted before the second instruction group completes is forced to restart at the beginning of the sequence by using a bit table that marks the beginning of the code for each translated CISC instruction. A translated sequence that is interrupted after the second instruction group completes but before the third instruction group completes is forced to complete the third instruction group with simple register moves.

The net effect is that the sequence either executes from beginning to end with no other translated sequence in the middle, or it is suspended before the completion of group 2 and retried from the beginning later. This case also applies to a 1- or 2-byte non-interlocked write on a single-processor machine. The translated sequence includes a state read-modify-write sequence, and the single write is the group 3 instruction.

The present invention more particularly concerns a method of operating the Y computer system 20 of FIG. 1 during the execution of a Y computer program that is a translation of a X computer program. In other words, the present invention more particularly concerns the reporting of an error when a source code program 10 is migrated to the Y executable code along the indirect path 24. In this situation, debug information typically generated by the X compiler 16 includes the addresses of the instructions in the X executable code. As will be further described below, however, the exception hardware and the Y executable code 22A is organized and operates upon Y code addresses. The present invention provides a linkage between a first address of a Y code instruction causing an error and a second address of a X code instruction from which the Y code instruction was translated. This linkage is used in an error handling procedure that begins with an exception signal in the hardware of the Y processor (80 of FIG. 4) and ends with the reporting of the error in association with an indication of the X code instruction.

Figure 7:
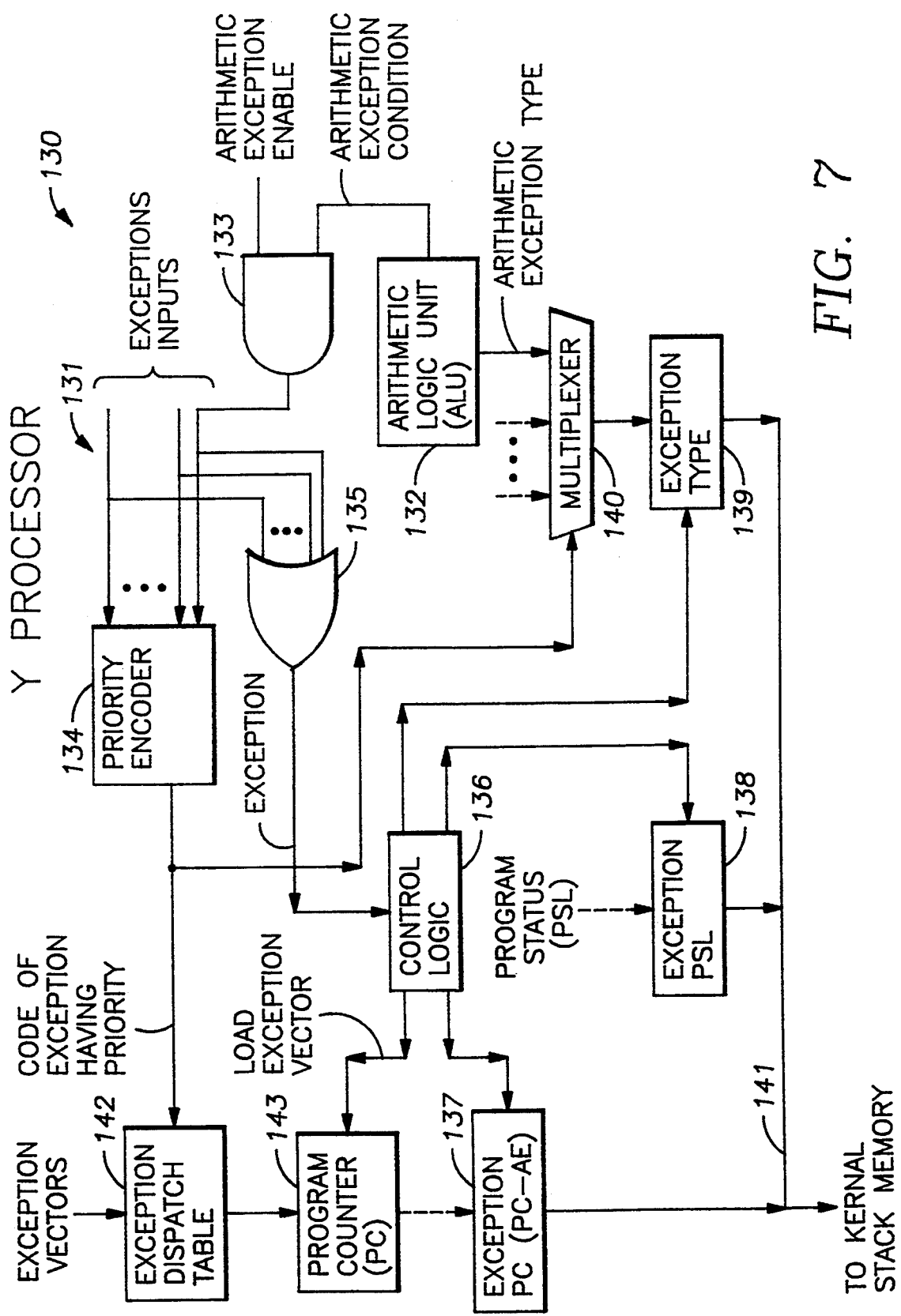
FIG. 7 is a block diagram of hardware in the Y computer for responding to exceptions.

Turning now to FIG. 7, there is shown the hardware generally designated 130 in the Y processor (80 of FIG. 4) for responding to a respective exception signal on any one of a plurality of exception inputs 131. The exception signals, for example, may include parity error signals indicating hardware faults, memory exceptions resulting from memory access instructions, and arithmetic exceptions from an arithmetic logic unit 132 resulting from arithmetic instructions.

The present invention more particularly concerns the reporting of application program errors which generate exceptions, such as arithmetic exceptions from the arithmetic logic unit 132. Arithmetic exceptions include, for example, integer or floating-point overflow, in which the result is too large to be stored in a predefined integer or floating-point format; integer or floating-point divide by 0, in which the divisor supplied is zero; and floating-point underflow, in which the result is too small to be expressed by a predefined floating-point format.

The arithmetic logic unit 132 senses the presence of the arithmetic exception conditions whenever an arithmetic operation is performed. Some of the Y-code instructions, however, disable or prevent the exception condition from generating an exception signal, and other Y-code instructions enable an arithmetic exception condition to generate an exception signal. This function is illustrated in FIG. 7 by an AND gate 133.

The Y processor is capable of responding to only a single one of the exception inputs at any given time. To handle the situation of multiple simultaneous exception signals, the exception inputs 131 are received in a priority encoder 134 which selects a single one of the signals. The exception signal granted priority is indicated by a code provided by the priority encoder 134.

The exception inputs 131 are combined in an OR gate 135 to provide an exception signal that is recognized by control logic 136. The control logic 136 temporarily suspends execution of Y-code instructions and controls the collection of data pertaining to the exception from respective registers or transmission gates 137, 138, 139. The data pertaining to the exception includes the "exception PC" which is the Y-code address (PC-AE) of the instruction causing the exception; the "exception PSL" which is the program status longword indicating the processor status at the time of execution of the instruction causing the exception, and exception type information which defines the type of the exception. In the case of an arithmetic exception, for example, the arithmetic logic unit 132 provides a code indicating the arithmetic exception type. In response to the code of the exception having priority, a multiplexer 140 selects the exception type information for the exception selected by the priority encoder 134.

The control logic 136 causes the exception information to be placed sequentially on a data bus 141 and stacked in kernel stack memory. Then, in response to the code of the exception selected by the priority encoder 134, a respective exception vector is read from an exception dispatch table 142 and loaded into the program counter 143. The control logic 136 then begins instruction execution starting at the exception vector in the program counter 143.

Figure 8:
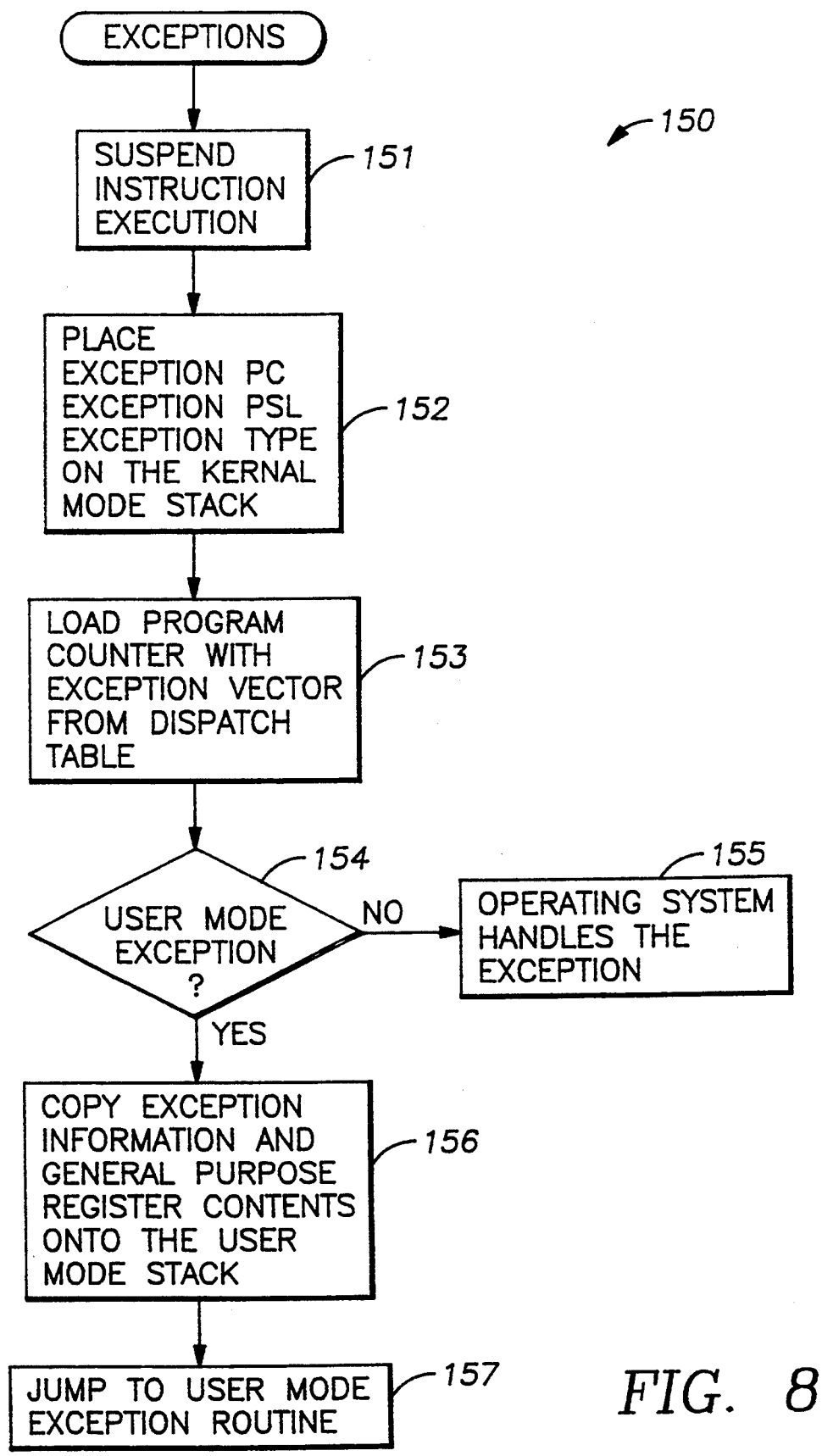
FIG. 8 is a flow chart of the operations performed by the hardware of FIG. 7 and an operating system exception handler routine performed by the Y computer.

Turning now to FIG. 8, there is shown a flow chart generally designated 150 which further illustrates the operation of the hardware of FIG. 7 in connection with an operating system routine for exception handling. As described above in FIG. 7, when an exception occurs, the hardware of FIG. 7 suspends instruction execution as noted in step 151 of FIG. 8, then places the exception PC, exception PSL and the exception type information on the kernel mode stack, as noted in step 152, and then loads the program counter with the respective exception vector from the dispatch table, as noted in step 153. In this case the exception vector is an exception handler in the "kernel mode" of the operating system.

The operating system exception handling routine begins in step 154 by checking whether the exception is a "user mode" exception to be handled by a user program rather than just the operating system. A hardware error occurring in response to the execution of an instruction, for example, would normally not be a user mode error, and the operating system would handle the exception in step 155. For a user mode exception, in step 156 the exception information that was placed on the kernel mode stack and the contents of the general purpose registers in the Y processor are placed on the user mode stack. Finally, in step 157, execution jumps to the user mode exception routine defined for handling the exception.

Figure 9:
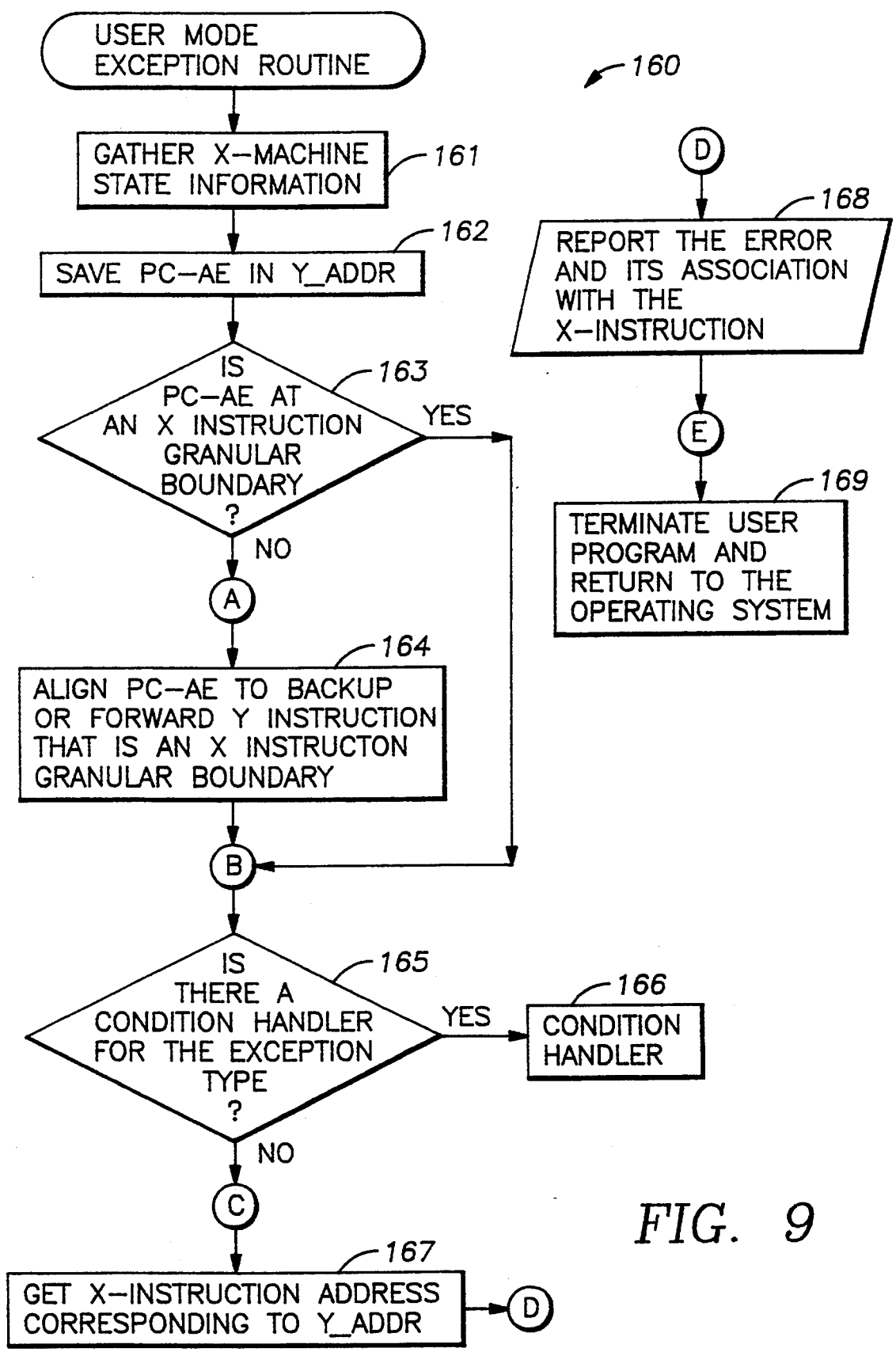
FIG. 9 is a flow chart of a procedure performed by a user mode exception routine for the Y computer.

Turning now to FIG. 9, there is shown a flow chart 160 of the user mode exception routine. In the first step 161, X-machine state information is gathered. In other words, a consistent model of the X-machine state is reconstructed in the Y machine registers and user memory. As will be further described below in connection with a specific example of Y code for the INCB —(R1) X-code instruction, the X-code instructions are translated to Y-code in such a fashion that a consistent model of the X-machine state can be reconstructed in step 161. Next, in step 162, the Y address of the Y-code instruction having the exception is saved in a memory location Y—ADDR so that it is available later for error reporting in accordance with the method of the invention.

In steps 163 and 164, the Y-address pointer PC-AE is aligned at an X instruction granular boundary, as was described above in connection with steps 106 and 110 of FIG. 5A. This may permit recovery and continued program execution from the aligned Y-address pointer PC-AE when there is a condition handler program. The availability of a condition handler for the exception type is checked in step 165. When such a condition handler is available, execution branches to the condition handler in step 166. Otherwise, in step 167, the user mode exception routine obtains the address of the X-code instruction from which the Y-code instruction causing the error was translated. The preferred method of obtaining this X-instruction address corresponding to Y—ADDR is further described below with reference to FIG. 13.

In step 168, the error is reported together with its association with the X-instruction having the X-address corresponding to Y—ADDR. The preferred error reporting procedure is further described below with reference to FIG. 15. In general, a Y-code program for performing step 168 can be obtained by translating a known X-code program for reporting errors that occur when X-code application programs are executed by an X-code computing system, and by slightly modifying the translated program so that it references the address of the X-instruction as the address of the instruction which caused the error, and so that any other X-machine state information that it references is the X-machine state information gathered in step 161. Therefore one important advantage of the present invention is that it permits existing X-code debug routines to be translated and used with slight modification for debugging translated application programs run on Y-code computer systems.

Figure 10:
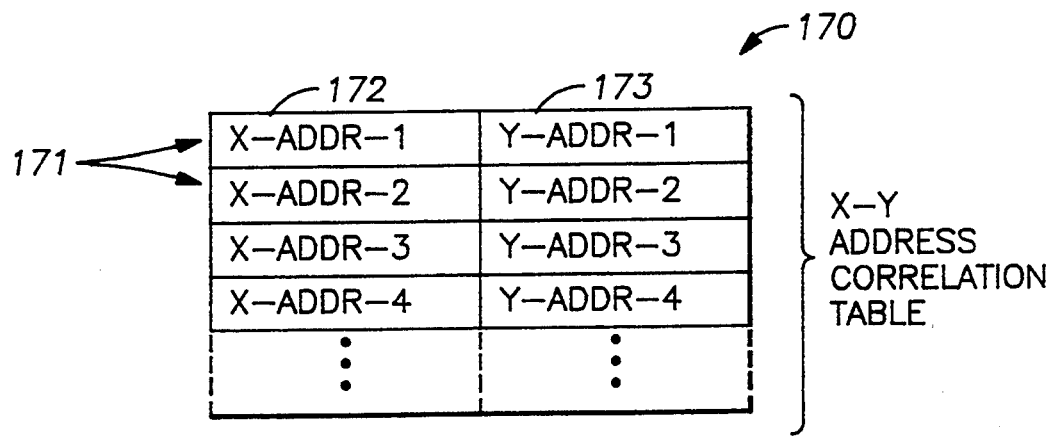
FIG. 10 is a schematic diagram of an X-Y address correlation table that is generated during the translation of the X application code to the Y application code and is used for obtaining the address of an X code instruction given the address of a Y code instruction when performing the error reporting method of the present invention.

The preferred embodiment of the invention uses an X-Y address correlation table for obtaining the X-instruction address corresponding to Y—ADDR. As shown in FIG. 10, the X-Y address correlation table 170 includes entries 171 each having an address 172 of a respective instruction in the X-code application program and an address 173 of a corresponding instruction in the Y-code application program having been translated from the X-code application program. Each address 172, 173, for example, is a 32-bit longword. When an instruction for a respective X-address in the table is translated into a series of Y-code instructions in the Y-code application program, then the corresponding Y-code instruction address in the table entry is the address of the first instruction in the series of instructions.

Preferably not all of the addresses of the instructions in the X-code application program are included in the X-Y address correlation table 170. Otherwise the table becomes very large, which would consume a good deal of memory space and unduly increase the time for searching the table. In addition to being used for reporting errors in accordance with the present invention, the table 170 can be used for returning from an X-code interpreter when executing a partial translation of an X-code application program. Although a complete translation is always desirable, it is not always possible to perform a complete translation due to the difficulty of finding all of the X-code in an X-code application program. In this situation the X-code interpreter can efficiently return to execution of Y-code in the translation so long as the X-code addresses in the table 170 are the entry points of basic blocks of X-code in the X-code application program. Each basic block is a sequence of contiguous instructions that has a single known entry point at the beginning of the basic block. Execution is transferred only to the beginnings of the basic blocks, and execution is transferred only from the ends of the basic blocks. Partial translations and the operation of an interpreter in such a situation are further described in the above-referenced Ser. No. 07/666,196, filed Mar. 7, 1991, entitled AUTOMATIC FLOWGRAPH GENERATION FOR PROGRAM ANALYSIS AND TRANSLATION by Richard L. Sites, incorporated herein by reference.

Figure 11:
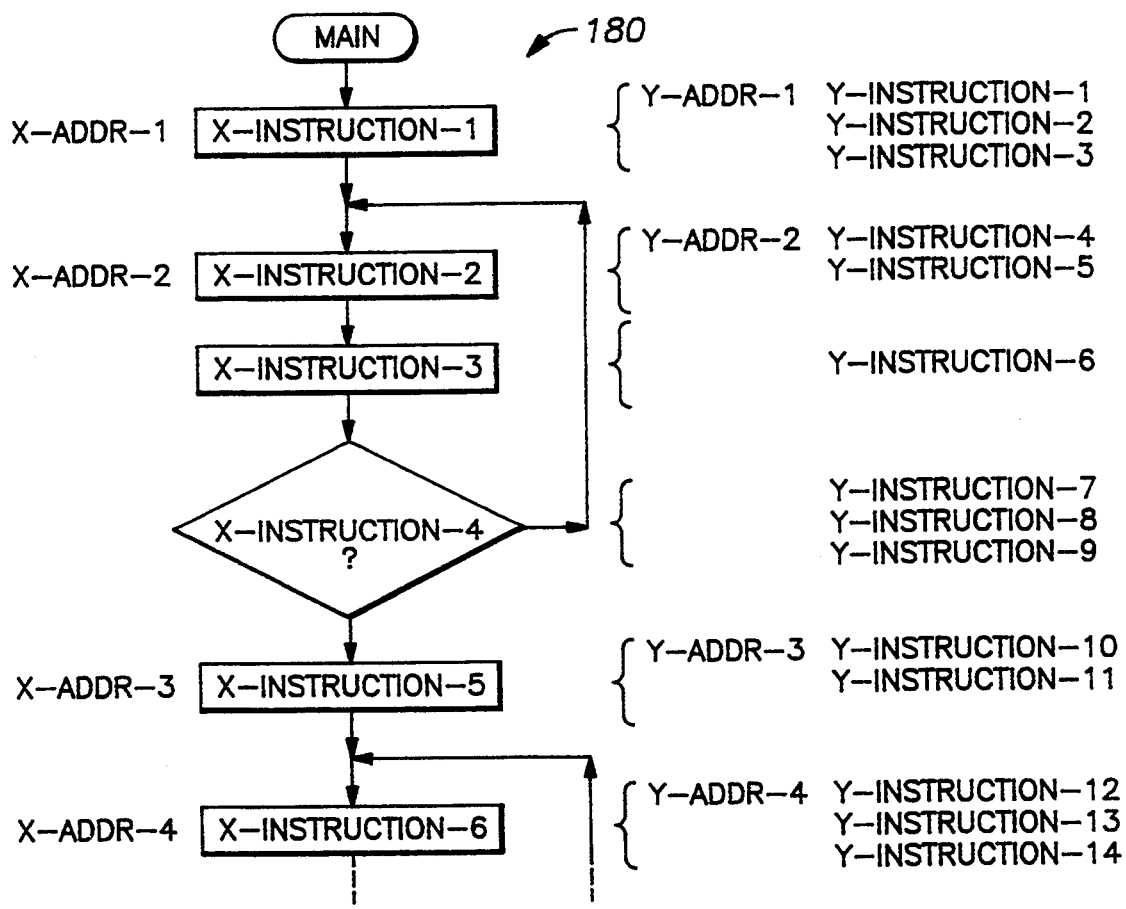
FIG. 11 is a schematic diagram representing the correspondence between instructions in the X application code and the Y application code, and X addresses and Y addresses stored in the address correlation table of FIG. 10.

Turning now to FIG. 11, there is shown an example of a portion of an X-code application program, called "MAIN", which has been drawn in the form of a flow chart 180 to illustrate the program's basic blocks. The first basic block consists of X-INSTRUCTION-1. The second basic block consists of X-INSTRUCTION-2, X-INSTRUCTION-3, and X-INSTRUCTION-4. The third basic block consists of X-INSTRUCTION-5. The fourth basic block begins with X-INSTRUCTION-6. Also shown in FIG. 11 is the correspondence between the X-code instructions and their corresponding Y-code instructions Y-INSTRUCTION-1 to Y-INSTRUCTION-14, and the X-code and Y-code addresses in the X-Y address correlation table 170 of FIG. 11.

Figure 12:
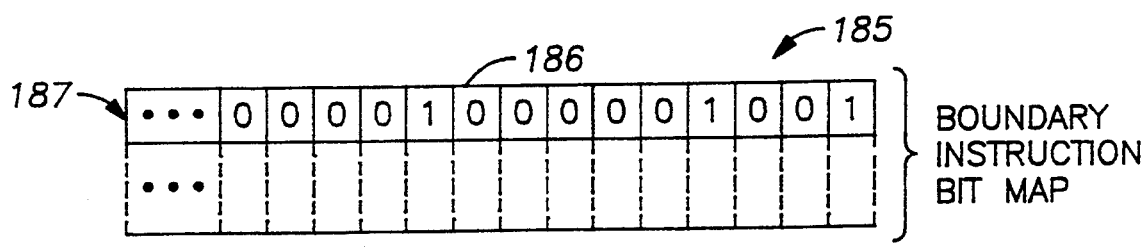
FIG. 12 is a schematic diagram of a boundary instruction bit map that is generated during the translation of the X application code to the Y application code and is used in carrying out the preferred method of the present invention.

The preferred embodiment of the invention also uses the boundary instruction bit map for obtaining the X-instruction address corresponding to Y—ADDR in the typical situation where Y—ADDR is not found in an entry in the X-Y address correlation table. Turning now to FIG. 12, there is shown the preferred format for the boundary instruction bit map 185. Single-bit flags, such as the flag 186, are packed into long words, such as long word 187. Each flag corresponds to one Y-code instruction, and the flag is set by the translator (32 in FIG. 1) when the corresponding Y-code instruction is a boundary instruction.

Preferably the flags in the boundary instruction bit map 185 are also set to indicate "artificial" granular boundaries in the VAX ® X-code. The desirability of indicating artificial granular boundaries arises when translating VAX ® X-code instructions having "precise" traps to RISC Y-code instructions that do not have precise traps. An instruction has a precise trap when execution of the instruction produces the same result when an exception condition arises (other than generating an exception signal) regardless of whether the exception is enabled or not. In the preferred RISC computer system, arithmetic instructions do not have precise traps because additional circuit complexity and execution cycles are required to complete the result of arithmetic instructions after exception conditions are detected, but if the programmer wants to emulate precise traps, it can be done by with a pair of instructions. The operation is first coded with an instruction having traps disabled, and then the operation is coded a second time with an instruction having traps enabled. To preserve X-instruction granularity for RISC Y-code, a "drain trap" (DRAINT) instruction is coded after the instruction having traps enabled. Because the RISC computer system might otherwise execute more than one instruction simultaneously, including the instruction having traps enabled together with an instruction following the instruction having traps enabled, the DRAINT instruction ensures that when a trap occurs, the X-machine state can be easily gathered in step 161 of FIG. 9 to form a consistent X-machine state corresponding to completion of the X-code instruction having been translated.

A specific example of the translation of an X-code instruction into a series of Y-code instructions including a Y-code instruction having traps enabled is given below:

```
        .TITLE Increment Byte Example Code
; The following code duplicates: INCB -(R1)
; with VAX ® Atomicity and using a PAL routine to store the
; results.
;======>Granular VAX ® Boundary
        BIS      R31,R31,R24       ;Clear Count of Interference
TOP:    RS       R31               ;Set Flag used by PAL routine to test
                                   ; for Interrupts or Exceptions
        LDQU     R16,-1(R1)        ;Most Likely Unaligned
        LDA      R17,-1(R1)        ;Address used to align bytes
        EXTBL    R16,R17,R18       ;Byte to 0000000A
        SLL      R18,#56,R18       ;Byte to A0000000
        BIS      R31,#1,R19        ;Position Constant 1
        SLL      R19,#56,R19       ; 10000000
        ADDQ     R18,R19,R16       ;Incremented to B0000000 (No Trap)
        SRL      R16,#56,R16       ;Byte to 0000000B
        CALL_PAL TRN_STB           ;Store Byte in R16 at address in R17
        BEQ      R0,INTERFERE      ;Failed, Make this a forward Branch to
                                   ; fool branch prediction
        SUBQ     R1,#1,R1          ;Perform Auto-Decrement (No Trap)
;======>Artificial Granular Boundary
        ADDQ/V  R18,R19,R16        ;Redo Operation to Get Overflow Trap
                                   ; if any
        DRAINT                     ;Wait for Trap if any
;======>Granular VAX ® Boundary
;    .
;    .
;    .
; Check to see if loop iterations are too many
INTERFERE;   ADDQ     R24,#1,R24   ;;Increment Interference
                                   ;; Count
             CMPULE   R24,#255,R0  ;;Been Here For A While?
             BNE      R0,TOP       ;;To, Try Again
             BUG_CHECK             ;;Abort...
        .END
```

In this example the ADDQ instruction occurs a first time with traps disabled to provide a complete arithmetic result, and a second time near the end of the series of Y-code instructions with traps enabled, followed by a DRAINT instruction. The address of the instruction having traps enabled is indicated above as an "artificial granular boundary" and its corresponding flag is set in the boundary instruction bit map. This provides improved performance when handling interrupts because the result of the X-code instruction (other than a possible trap) is complete at the artificial granular boundary. Therefore, when an interrupt occurs just before the trap, the PC_AE can be aligned to the artificial granular boundary in step 110 of FIG. 5A to preserve X-code instruction granularity without completely backing up to the boundary instruction at the beginning of the Y-code translated from the X-code instruction.

Figure 13:
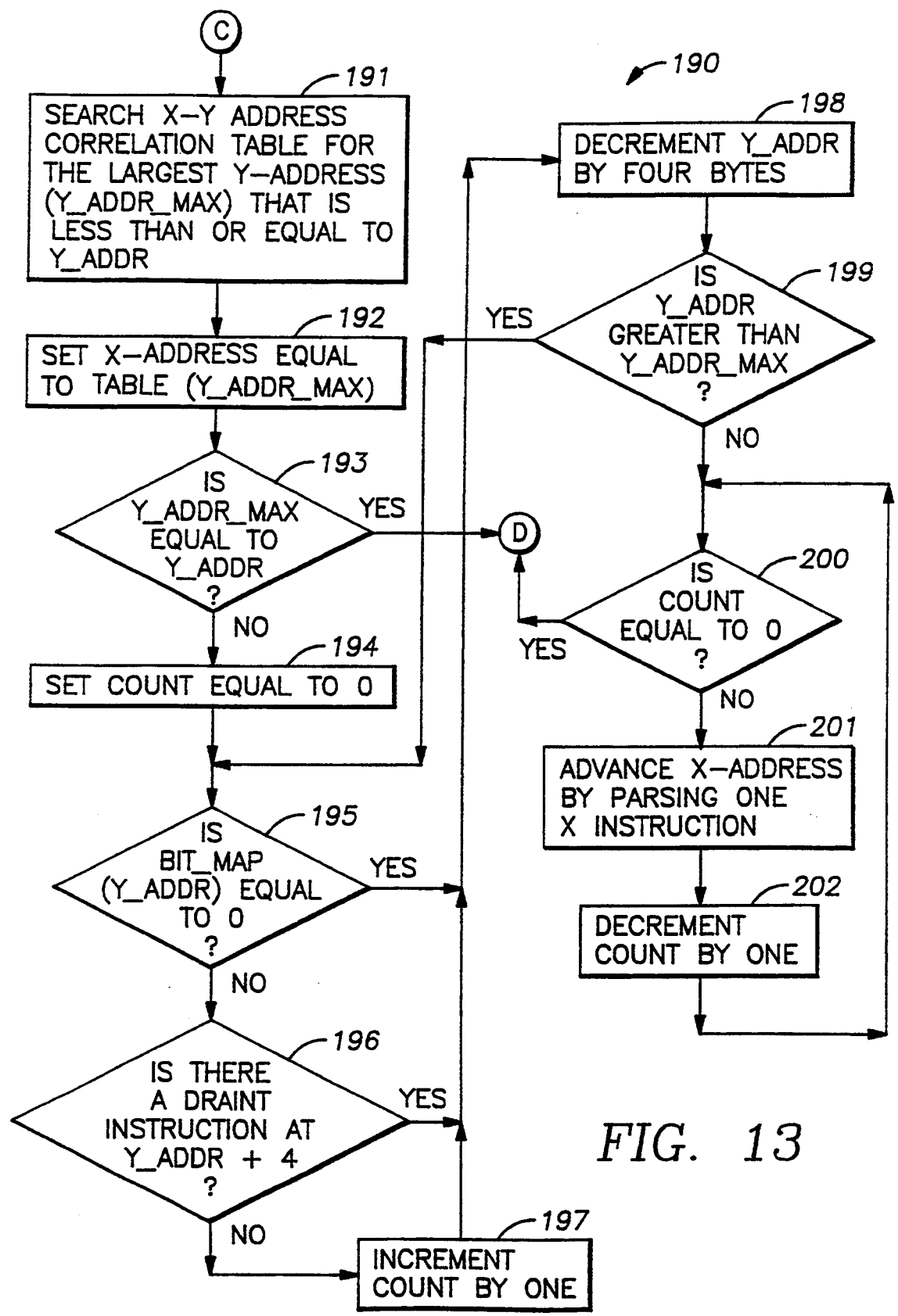
FIG. 13 is a flow chart of a procedure for using the X-Y address correlation table of FIG. 10 and the boundary instruction bit map of FIG. 12 in carrying out the preferred method of the present invention.

Turning now to FIG. 13, there is shown a flow chart 190 of the preferred procedure for using the X-Y address correlation table (170 in FIG. 10) and the boundary instruction bit map (185 in FIG. 12) to find the address of the X-code instruction corresponding to the Y-code address Y_ADDR. In the first step 191, the X-Y address correlation table is searched to find the largest Y-code address in the table (Y_ADDR_MAX) that is less than or equal to Y_ADDR. Next, in step 192, the contents of a memory location X-ADDRESS is set equal to the X-code address from the table entry including Y_ADDR_MAX. Then, in step 193, the procedure of FIG. 13 is finished, with the desired X-code address in X_ADDRESS, when Y_ADDR_MAX is equal to Y_ADDR. Otherwise, in step 194, the contents of a memory location COUNT are cleared to begin counting of the number of Y-code boundary instructions between Y_ADDR and Y_ADDR MAX. This is done while scanning the boundary instruction bit map.

In step 195, the flag in the bit map at the position corresponding to (Y_ADDR) is tested. When the flag is set, then in step 196 the opcode of the following instruction (at Y_ADDR+4, because instructions are 4 bytes long in the Y instruction architecture) is inspected to check whether it is a DRAINT instruction. When this is the case, the instruction at Y_ADDR is an instruction having traps enabled, and the corresponding flag found in step 195 to have been set is a flag for an artificial granular boundary. If the flag is set but it is not for an artificial granular boundary, then in step 197 COUNT is incremented by one.

In step 198, Y_ADDR is decremented by four bytes, corresponding to the length of one RISC Y-code instruction. To test whether scanning back to Y_ADDR_MAX is finished, Y_ADDR is compared to Y_ADDR_MAX, and when Y_ADDR is greater than Y_ADDR_MAX, scanning continues in step 195. Otherwise, in step 200, the value of COUNT is compared to zero. When count is zero, the value of X-ADDRESS is the desired address of the X-code instruction, and execution continues in step 168 of FIG. 9. Otherwise, in step 201, the X_ADDRESS is used as an X-code instruction decode pointer and is advanced by parsing one X-instruction, and in step 202 COUNT is decremented by 1. Steps 200, 201 and 202 are repeated until the counted number of X-instructions are parsed, and X-ADDRESS becomes advanced to the desired address.

Turning now to FIG. 14, there is shown a block diagram of debug information 220 having been generated when the X-code application program was compiled. To permit the reporting of a source code line number corresponding to a given X-code instruction address, the debug information includes traceback information 221. The traceback information, for example, includes a list of records of the X-code address range associated with each line number of source code. The X-code address range indicates the address range of the X-code instructions compiled from the line of source code. Some compilers compile separate source code modules that are linked together by the linker (18 in FIG. 1). In this case the compiler generates a module table (not shown) that has records including module names and associated X-code address ranges. In this case the compiler also generates a separate table of traceback information for each module.

The debug information 220 further includes symbolic name information 222 associating symbolic names which occur in the application source code with memory addresses and stack locations referenced in the X-code application program. The symbolic name information 222, for example, includes records of the X-code address range associated with each global variable in the source code, and records of the X-code address range associated with each routine in the source code. In addition, each routine may have associated with it a number of records of the stack frame offset for each local variable in the routine. The records of the symbolic name information 222 include pointers to strings 223 which contain the symbolic names in ASCII code.

Figure 15:
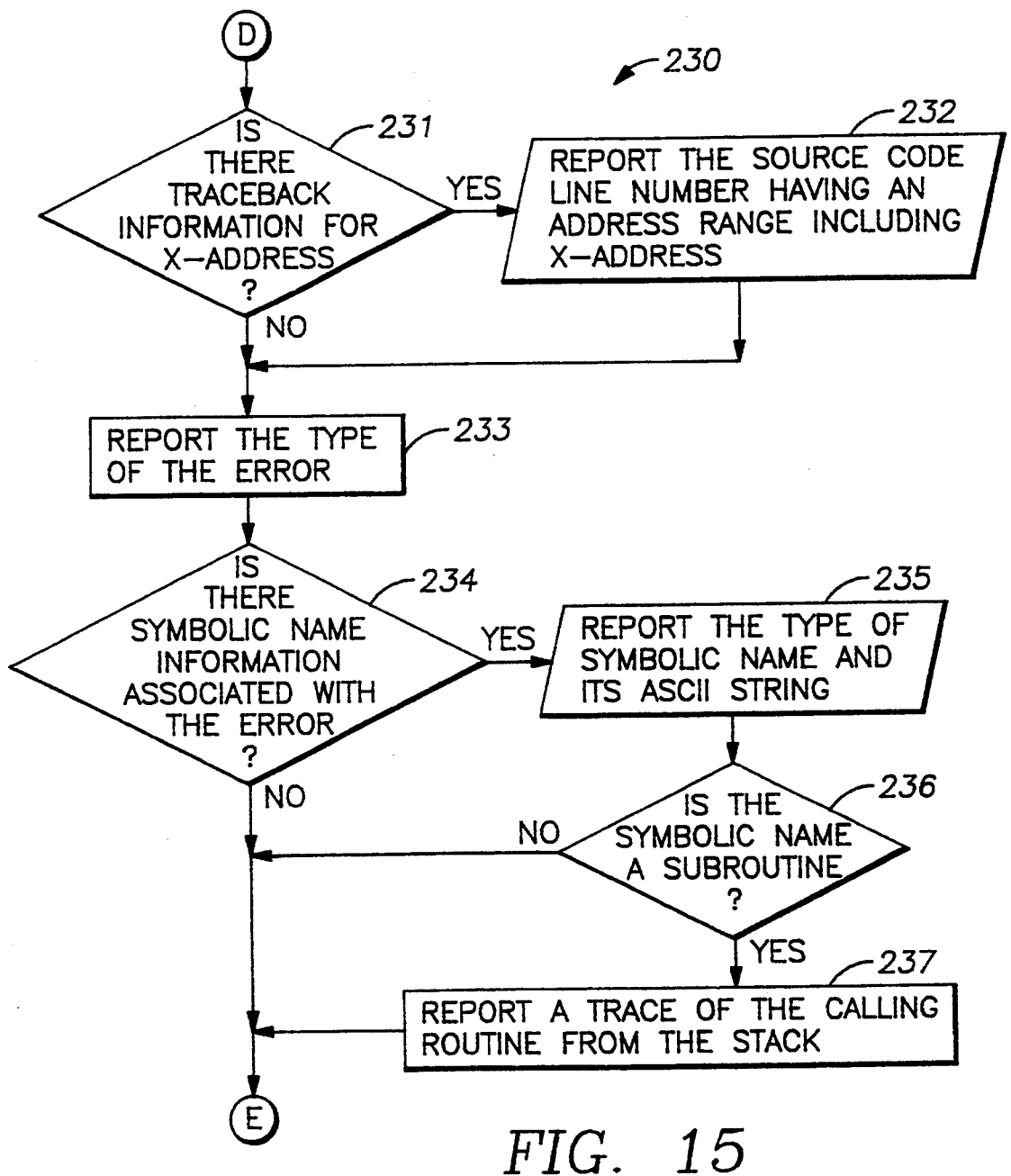
FIG. 15 is a flow chart of a procedure for using the debug information of FIG. 14 to indicate that an error is associated with one of the instructions in the X application code.

Turning now to FIG. 15, there is shown the preferred procedure for using the debug information of FIG. 14 for reporting an error and its association with the X-ADDRESS of the X-code instruction generating the error. In step 231 the records of traceback information (221 in FIG. 14) are searched for a record having an address range including X-ADDRESS. When such a record is found, in step 232 the source code line number in the record is reported to the programmer or user. In step 233 the type of error is determined from the exception type information and reported to the programmer or user. Next, in step 234 the records of symbolic name information are searched for a symbolic name associated with the error. The records of routines, for example, are searched for a record having an address range including X-ADDRESS. If an associated routine name is found, it is reported in step 235 along with its type and its ASCII string. In step 236, when the symbolic name is a subroutine, error reporting continues to step 237. In step 237 the stack in the X-machine state information (gathered in step 161 of FIG. 9) is inspected to provide a trace of a chain of calling routines ending with the subroutine, which is reported to the programmer or user.

In steps 234 and 235 global and local variables associated with an error may also be found and reported. In the case of an overflow or underflow arithmetic error, for example, the X-code instruction at X-ADDRESS and a few following instructions can be inspected in an attempt to identify a result address of a global or local variable into which the result of the arithmetic operation is stored. In the case of a divide-by-zero error, a few preceding X-code instructions can be inspected in an attempt to identify the source address of a global or local variable from which the divisor originated.

Examples of error messages that could be reported using the procedure of FIG. 15 include the following:
LINE 200 INTEGER OVERFLOW IN SUBROUTINE "DIVIDEND" WHEN CALLED BY ROUTINE "MAIN" AT LINE 50, RESULT STORED IN LOCAL VARIABLE "TOTAL".
LINE 500 FLOATING-POINT DIVIDE BY ZERO IN SUBROUTINE "STOCK" WHEN CALLED BY ROUTINE "MAIN" AT LINE 75, DIVISOR FROM GLOBAL VARIABLE "SHARES".

In view of the above, there has been described a method and system for reporting an error occurring during the execution of a Y-code application program in the context of an X-code application program from which the Y-code application program was translated. The invention provides the address in the X-code of an X-code instruction corresponding to the Y-code instruction which caused the error, together with consistent information about the state that an X-code machine would have upon completion of execution of the X-code instruction. Therefore the error can be reported by debug routines that are translated from X-code to Y-code and that use debug information generated during compilation of source code for the X-code application program.

I claim:

1. A method of operating a digital computer for reporting an error occurring during execution of a second computer program that is a translation of a first computer program, said first computer program including instructions from a first instruction set based upon a first instruction architecture, each of said instructions in said first computer program having a respective address, said second computer program including instructions from a second instruction set based upon a second instruction architecture, each of said instructions in said second computer program having a respective address, some of said instructions in said first computer program each having been translated into a respective plurality of said instructions in said second computer program, said error being caused by execution of one of said instructions in said second computer program, said method comprising the steps of:
  (a) aborting the execution of said second computer program when said error occurs; and then
  (b) determining a first address of said one of said instructions in said second computer program;
  (c) determining from said first address a second address of one of said instructions in said first computer program from which said one of said instructions in said second computer program was translated;
  (d) reporting that said error occurred, and using said second address to indicate that said error is associated with said one of said instructions in said first program;
  (e) wherein an address correlation table was generated during translation of said first computer program to obtain said second computer program, said address correlation table including entries each having an address of a respective instruction in said first computer program and an address of a first instruction in a set of instructions in said second computer program, not all of the addresses of the instructions in said first computer program being included in entries in said address correlation table, said set of instructions in said second computer program having been translated from said respective instruction in said first computer program, and wherein said step (c) of determining from said first address a second address includes referencing said address correlation table with said first address; and (f) wherein a boundary instruction bit map was generated during translation of said first computer program to obtain said second computer program, said boundary instruction bit map indicating instructions in said second computer program which begin sets of instructions translated from respective instructions in said first computer program, and wherein said step (c) of determining from said first address a second address further includes scanning said boundary instruction bit map between a first position in said bit map corresponding to said first address and a second position in said bit map corresponding to an address in said second computer program that is in an entry in said address correlation table, and when scanning said boundary instruction bit map counting indications in said bit map between said first position and said second position to obtain a count of instructions, reading from said entry in said address correlation table a third address in said first computer program, and determining said second address from said third address and said count of instructions.

2. The method as claimed in claim 1, wherein said first computer program was compiled from a source program, and traceback information was generated when said first computer program was compiled, said traceback information associating line numbers of lines of source code in said source program with addresses of instructions in said first computer program compiled from respective ones of said lines of source code, and wherein said second address is used together with said traceback information to indicate that said error is associated with said one of said instructions in said first computer program by indicating the line number of the source code from which said one of said instructions in said first computer program was compiled.

3. The method as claimed in claim 1, wherein said first computer program was compiled from a source program, and symbolic name information was generated when said first computer program was compiled, said symbolic name information associating symbolic names in said source program with addresses in said first computer program, and wherein said method further comprises referencing said symbolic name information to identify a symbolic name associated with said error, and reporting said symbolic name together with said error.

4. The method as claimed in claim 1, wherein said second address is determined from said third address by parsing a selected number of instructions beginning from said third address, said selected number of instructions being based upon said count of instructions.

5. The method as claimed in claim 1, wherein said boundary instruction bit map also includes indications of instructions in said second computer program that have traps enabled, and said indications of instructions in said second program that have traps enabled are not counted during said counting indications in said bit map between said first and said second position to obtain said count of instructions.

6. A method of operating a digital computer for reporting the occurrence of an error during the execution of a second computer program that is a translation of a first computer program, said first computer program having been generated by compiling a source program, said first computer program including instructions from a first instruction set based upon a first instruction architecture, each of said instructions in said first computer program having a respective address, said second computer program including instructions from a second instruction set based upon a second instruction architecture, each of said instructions in said second computer program having a respective address, some of said instructions said first computer program each having been translated into a respective plurality of said instructions in said second computer program, said error being caused by execution of one of said instructions in said second computer program, said method comprising the steps of:

(a) aborting the execution of said second computer program when said error occurs;

(b) determining a first address of said one of said instructions in said second computer program;

(c) referencing an address translation table to determine from said first address a second address of one of said instructions in said first computer program from which said one of said instructions in said second computer program was translated;

(d) referencing traceback information to identify a portion of source code in said source program from which said one of said instructions in said first computer program was compiled; and (e) reporting that said error occurred, and indicating said portion of source code in said source program from which said one of said instruction in said first computer program was compiled;

wherein said address correlation table includes entries each having an address of a respective instruction is said first computer program and an address of a first instruction in a set of instructions in said second computer program, said set of instructions in said second computer program having been translated from said respective instruction in said first computer program; not all of the addresses of the instructions in said first computer program are included in entries in said address correlation table; a boundary instruction bit map was generated during translation of said first computer program to obtain said second computer program, said boundary instruction bit map indicating instructions in said second computer program which begin sets of instructions translated from respective instructions in said first program; and wherein said means for referencing said address translation table further includes means for scanning said boundary instruction bit map between a first position in said bit map corresponding to said first address and a second position in said bit map corresponding to an address in said second computer program that is in an entry in said address correlation table, means for counting indications in said bit map between said first position and said second position to obtain a count of instructions, means for reading from said entry in said address correlation table a third address ins said first computer program, and means for determining said second address from said third address and said count of instructions.

7. The method as claimed in claim 6, wherein symbolic name information was generated when said first computer program was compiled, said symbolic name information associating symbolic names in said source program with addresses in said first computer program, and wherein said method further comprises referencing said symbolic name information to identify a symbolic name associated with said error, and reporting said symbolic name together with said error.

8. The method as claimed in claim 7, wherein said symbolic name is the name of a routine in said source program that includes source code from which said one of said instructions in said first program was compiled.

9. The method as claimed in claim 6, wherein said second address is determined from said third address by parsing a selected number of instructions beginning from said third address, said selected number of instructions being based upon said count of instructions.

10. The method as claimed in claim 6, wherein said boundary instruction bit map also includes indications of instructions in said second computer program that have traps enabled, and said indications of instructions in said second computer program that have traps enabled are not counted during said counting indications in said bit map between said first and said second position to obtain said count of instructions.

11. A method of operating a digital computer for reporting an error occurring during the execution of a second computer program that is a translation of a first computer program, said first computer program including instructions from a first instruction set based upon a first instruction architecture, each of said instructions in said first computer program having a respective address, said second computer program including instructions from a second instruction set based upon a second instruction architecture, each of said instructions in said second computer program having a respective address, some of said instructions in said first computer program each having been translated into a respective plurality of said instructions in said second computer program, said translation having generated an address correlation table and a boundary instruction bit map, said address correlation table including entries each having a respective address of an instruction in said first program and an address of a first instruction in a set of instructions in said second program having been translated from said respective instruction, not all of the addresses of the instructions in said first computer program being included in entries in said address correlation table, said boundary instruction bit map including flags indicating instructions in said second program that are first instructions in sets of instructions obtained by translating respective instructions in said first computer program, said error being caused by execution of one of said instructions in said second computer program, said method comprising the steps of:

(a) aborting the execution of said second computer program when said error occurs; and then (b) determining a first address of said one of said instructions in said second computer program;

(c) determining from said first address a second address of one of said instructions in said first computer program from which said one of said instructions in said second computer program was translated, said second address being determined by referencing said address correlation table to find in said table the largest address of an instruction in said program that is smaller than said first address, and the corresponding address of the instruction in said first program in the same table entry as said largest address;

scanning said boundary instruction bit map to obtain a counted number of the instructions indicated by said flags in said second program having addresses between said first address and said largest address; and parsing said counted number of instructions in said first program beginning from said corresponding address while advancing an instruction address pointer which thereby is advanced to said second address; and (d) reporting that said error occurred, and using said second address to indicate that said error is associated with said one of said instructions in said first program.

12. The method as claimed in claim 11, wherein said first computer program was compiled from a source program, and traceback information was generated when said first computer program was compiled, said traceback information associating line numbers of lines of source code in said source program with addresses of instructions in said first computer program compiled from respective ones of said lines of source code, and wherein said second address is used together with said traceback information to indicate that said error is associated with said one of said instructions in said first computer program by indicating the line number of the source code from which said one of said instructions in said first computer program was compiled.

13. The method as claimed in claim 11, wherein said first computer program was compiled from a source program, and symbolic name information was generated when said first computer program was compiled, said symbolic name information associating symbolic names in said source program with addresses in said first computer program, and wherein said method further comprises referencing said symbolic name information to identify a symbolic name associated with said error, and reporting said symbolic name together with said error.

14. The method as claimed in claim 11, wherein said flags in said boundary instruction bit map also indicate instructions in said second computer program that have traps enabled, and said instructions in said second program that have traps enabled are not counted during said scanning.

15. A digital computer system for reporting the occurrence of an error during the execution of a second computer program that is a translation of a first computer program, said first computer program having been generated by compiling a source program, said first computer program including instructions from a first instruction set based upon a first instruction architecture, each of said instructions in said first computer program having a respective address, said second computer program including instructions from a second instruction set based upon a second instruction architecture, each of said instructions in said second computer program having a respective address, some of said instructions said first computer program each having been translated into a respective plurality of said instructions in said second computer program, said error being caused by execution of one of said instructions in said second computer program, said digital computer system comprising, in combination:

(a) means for aborting the execution of said second computer program when said error occurs;

(b) means for determining a first address of said one of said instructions in said second computer program;

(c) means for referencing and address translation table to determine from said first address a second address of one of said instructions in said first computer program from which said one of said instructions in said second computer program was translated;

(d) means for reference traceback information to identify a portion of source code in said source program from which said one of said instructions in said first computer program was compiled; and (e) means for reporting that said error occurred, and indicating said portion of source code in said source program from which said one of said instruction in said first computer program was compiled;

wherein said address correlation table includes entries each having an address of a respective instruction is said first computer program and an address of a first instruction in a set of instructions in said second computer program, said set of instructions in said second computer program having been translated from said respective instruction in said first computer program; not all of the addresses of the instructions in said first computer program are included in entries in said address correlation table; a boundary instruction bit map was generated during translation of said first computer program to obtain said second computer program, said boundary instruction bit map indicating instructions in said second computer program which begin sets of instructions translated from respective instructions in said first program; and wherein said means for referencing said address translation table further includes means for scanning said boundary instruction bit map between a first position in said bit map corresponding to said first address and a second position in said bit map corresponding to an address in said second computer program that is in an entry in said address correlation table, means for counting indications in said bit map between said first position and said second position to obtain a count of instructions, means for reading from said entry in said address correlation table a third address ins said first computer program, and means for determining said second address from said third address and said count of instructions.

16. The digital computer system as claimed in claim 15, further comprising means for referencing symbolic name information to identify a symbolic name associated with said error, and reporting said symbolic name together with said error.

17. The digital computer system as claimed in claim 15, wherein said means for determining said second address from said third address includes means for parsing a selected number of instructions beginning from said third address, said selected number of instructions being selected based upon said count of instructions.

18. The digital computer system as claimed in claim 11, wherein said boundary instruction bit map also includes indications of instructions in said second computer program that have traps enabled, and said means for counting does not count indications of instructions in said second computer program that have traps enabled.

19. A digital computer system for reporting the occurrence of an error during the execution of a second computer program that is a translation of a first computer program, said first computer program having been generated by compiling a source program, said first and second computer programs including instructions from respective first and second instruction sets, each of said instructions in said first and second computer programs having a respective address, some of said instructions in said first computer program each having been translated into a respective group of said instructions in said second computer program, said error being caused by execution of one of said instructions in said second computer program, said digital computer system comprising:

(a) means for aborting the execution of said second computer program when said error occurs;

(b) means for determining a first address of said one of said instructions in said second computer program;

(c) a boundary instruction bit map generated during translation of said first computer program to obtain said second computer program, said boundary instruction bit map indicating instructions in said second computer program which begin each said group of instructions; said means for referencing said address translation table including (i) means for scanning said boundary instruction bit map between a first position in said bit map corresponding to said first address and a second position in said bit map corresponding to an address in said second computer program that is in an entry in said address correlation table, (ii) means for counting indications in said bit map between said first position and said second position to obtain a count of instructions, (iii) means for reading from said entry in said address correlation table a third address in said first computer program, and (iv) means for determining said second address from said third address and said count of instructions;

(d) means for referencing an address translation table to determine from said first address a second address of one of said instructions in said first computer program from which said one of said instructions in said second computer program was translated; said address correlation table including entries each having an address of a respective instruction in said first computer program and an address of a first instruction in a respective group of instructions;

(e) means for referencing traceback information to identify a portion of source code in said source program from which said one of said instructions in said first computer program was compiled; and (f) means for reporting that said error occurred, and indicating said portion of source code in said source program from which said one of said instructions in said first computer program was compiled.

20. The digital computer system as claimed in claim 19, further comprising means for referencing symbolic name information to identify a symbolic name associated with said error, and reporting said symbolic name together with said error.

21. The digital computer system as claimed in claim 19, wherein said means for determining said second address from said third address includes means for parsing a selected number of instructions beginning from said third address, said selected number of instructions being selected based upon said count of instructions.

22. The digital computer system as claimed in claim 19, wherein said boundary instruction bit map also includes indications of instructions in said second computer program that have traps enabled, and said means for counting does not count indications of instructions in said second computer program that have traps enabled.

23. A method of operating a digital computer for reporting an error occurring during the execution of a second computer program that is a translation of a first computer program, said first and second computer programs including instructions from respective first and second instruction sets each of said instructions in said first and second computer programs having a respective address, some of said instructions in said first computer program each having been translated into a respective group of said instructions in said second computer program, said translation having generated an address correlation table and a boundary instruction bit map, said address correlation table including entries each having a respective address of an instruction in said first program and an address of a first instruction in a respective group of instructions in said second program, said boundary instruction bit map including flags indicating instructions in said second program that are first instructions in said groups of instructions, said error being caused by execution of one of said instructions in said second computer program, said method comprising the steps of:

(a) aborting the execution of said second computer program when said error occurs; and then
(b) determining a first address of said one of said instructions in said second computer program;
(c) determining from said first address a second address of one of said instructions in said first computer program from which said one of said instructions in said second computer program was translated, said second address being determined
  by referencing said address correlation table to find in said table the largest address of an instruction in said program that is smaller than said first address, and the corresponding address of the instruction in said first program in the same table entry as said largest address;
  scanning said boundary instruction bit map to obtain a counted number of the instructions indicated by said flags in said second program having addresses between said first address and said largest address; and
  parsing said counted number of instructions in said first program beginning from said corresponding address while advancing an instruction address pointer which thereby is advanced to said second address; and
(d) reporting that said error occurred, and using said second address to indicate that said error is associated with said one of said instructions in said first program.

24. The method as claimed in claim 23, wherein not all of the addresses of the instructions in said first computer program are included in entries in said address correlation table.

* * * * *